United States Patent
Wang et al.

(10) Patent No.: US 11,646,834 B2
(45) Date of Patent: May 9, 2023

(54) METHOD AND DEVICE FOR TRANSMITTING UPLINK CONTROL INFORMATION

(71) Applicant: Samsung Electronics Co., Ltd., Suwon-si (KR)

(72) Inventors: Yi Wang, Beijing (CN); Yingyang Li, Beijing (CN); Shichang Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/053,545

(22) PCT Filed: May 7, 2019

(86) PCT No.: PCT/KR2019/005425
§ 371 (c)(1),
(2) Date: Nov. 6, 2020

(87) PCT Pub. No.: WO2019/216620
PCT Pub. Date: Nov. 14, 2019

(65) Prior Publication Data
US 2021/0234643 A1     Jul. 29, 2021

(30) Foreign Application Priority Data

May 10, 2018   (CN) .......................... 201810445224.1
Jul. 4, 2018    (CN) .......................... 201810726475.7
(Continued)

(51) Int. Cl.
*H04W 76/27*     (2018.01)
*H04L 1/1829*    (2023.01)
(Continued)

(52) U.S. Cl.
CPC .......... *H04L 1/1861* (2013.01); *H04L 1/1887* (2013.01); *H04L 5/0055* (2013.01);
(Continued)

(58) Field of Classification Search
None
See application file for complete search history.

(56) References Cited

U.S. PATENT DOCUMENTS 10,270,580 B2   4/2019  Ahn et al.
10,342,005 B2   7/2019  Song et al.
(Continued)

FOREIGN PATENT DOCUMENTS

CN   102123501 A    7/2011
CN   102223215 A   10/2011
(Continued)

OTHER PUBLICATIONS

Spreadtrum Communications, 'Remaining issues on HARQ-ACK codebook', R1-1804227, 3GPP TSG RAN WG1 Meeting #92bis, Sanya, China, Apr. 6, 2018.
(Continued)

*Primary Examiner* — Sithu Ko
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present application provides a method for transmitting uplink control information (UCI), comprising:
(Continued)

detecting a physical el downlink control channel (PDCCH) and receiving a physical downlink shared channel (PDSCH) scheduled by the PDCCH, by a user equipment (UE); determining, by the UE, hybrid automatic repeat request acknowledge (HARQ-ACK) information to be fed back and physical uplink control channel (PUCCH) resource for transmitting the UCI according to at least one of the following: slot lengths of downlink bandwidth part (BWP) and uplink BWP, HARQ-ACK codebook information and UE's processing capability requirements; transmitting, by the UE, the HARQ-ACK information on the PUCCH resource. The method of the present invention may support a method for determining the HARQ-ACK codebook while multiple PUCCH resources and multiple slot lengths.

19 Claims, 27 Drawing Sheets

(30) Foreign Application Priority Data

Jan. 8, 2019 (CN) .......................... 201910017209.1
Feb. 14, 2019 (CN) .......................... 201910115008.5

(51) Int. Cl.
H04L 1/1867 (2023.01)
H04L 5/00 (2006.01)
H04W 72/044 (2023.01)
H04W 72/1273 (2023.01)
H04W 72/21 (2023.01)

(52) U.S. Cl.
CPC ..... *H04W 72/044* (2013.01); *H04W 72/1273* (2013.01); *H04W 72/21* (2023.01)

(56) References Cited

U.S. PATENT DOCUMENTS

| | | | | |
|---|---|---|---|---|
| 10,856,320 | B2* | 12/2020 | Jung | H04L 5/0091 |
| 10,985,893 | B2* | 4/2021 | Yoshimoto | H04L 1/1896 |
| 11,051,328 | B2* | 6/2021 | Gao | H04L 5/001 |
| 11,265,853 | B2* | 3/2022 | Kundu | H04B 7/0632 |
| 11,412,461 | B2* | 8/2022 | Lee | H04L 1/1825 |
| 2012/0281645 | A1 | 11/2012 | Li et al. | |
| 2014/0293884 | A1 | 10/2014 | Larsson et al. | |
| 2015/0092757 | A1 | 4/2015 | Tiirola et al. | |
| 2016/0014778 | A1 | 1/2016 | Zhou et al. | |
| 2016/0338041 | A1 | 11/2016 | Li et al. | |
| 2018/0167173 | A1 | 6/2018 | Guan et al. | |
| 2019/0109692 | A1 | 4/2019 | Gao et al. | |
| 2019/0149271 | A1* | 5/2019 | Yin | H04W 88/023 370/329 |
| 2019/0150181 | A1* | 5/2019 | Kim | H04W 72/1289 370/329 |
| 2019/0342035 | A1* | 11/2019 | Zhang | H04L 1/0073 |
| 2019/0342944 | A1* | 11/2019 | Chatterjee | H04W 92/10 |
| 2020/0154467 | A1* | 5/2020 | Gong | H04W 72/12 |
| 2020/0213044 | A1* | 7/2020 | Peng | H04L 1/1819 |
| 2020/0214006 | A1* | 7/2020 | Choi | H04L 1/1858 |
| 2020/0374084 | A1* | 11/2020 | Yuan | H04L 5/0005 |
| 2021/0184801 | A1* | 6/2021 | El Hamss | H04W 72/0446 |
| 2021/0250130 | A1* | 8/2021 | Lei | H04L 1/1816 |

FOREIGN PATENT DOCUMENTS

| | | | |
|---|---|---|---|
| CN | 102769507 | A | 11/2012 |
| CN | 104685923 | A | 6/2015 |
| CN | 106301720 | A | 1/2017 |
| CN | 107231218 | A | 10/2017 |
| EP | 3 324 565 | A1 | 5/2018 |
| WO | 2016/108658 | A1 | 7/2016 |
| WO | 2017/024539 | A1 | 2/2017 |
| WO | 2017/030489 | A1 | 2/2017 |

OTHER PUBLICATIONS

Vivo, 'Other aspects on carrier aggregation', R1-1803841, 3GPP TSG RAN WG1 Meeting #92bis, 3GPP TSG RAN WG1 Meeting #92bis, Sanya, China, Apr. 6, 2018.
LG Electronics, 'Remaining issues on CA and HARQ-ACK codebook', R1-1804562, 3GPP TSG RAN WG1 Meeting #92bis, Sanya, China, Apr. 7, 2018.
NTT Docomo, Inc. (Rapporteur), "RAN WG's progress on NR WI in the February meeting 2018", 3GPP Draft; R2-1804394, 3rd Generation Partnership Project (3GPP), Mobile Competence Centre; 650, Route Des Lucioles; F-06921 Sophia-Antipolis Cedex; France vol. RAN WG2, No. Sanya, China Apr. 16, 2018-Apr. 2, 2018 Apr. 14, 2018, XP051428139.
Extended European Search Report dated Dec. 14, 2021, issued in European Patent Application No. 19800572.0.
Chinese Office Action dated May 7, 2022, issued in a counterpart Chinese Application No. 202110536409.5.
Samsung: Summary on CA Aspects; 3GPP TSG RAN WGI NR AH1801; RI-1801024; Jan. 26, 2018, Vancouver, Canada. Agenda item 7.3.4.2.

* cited by examiner

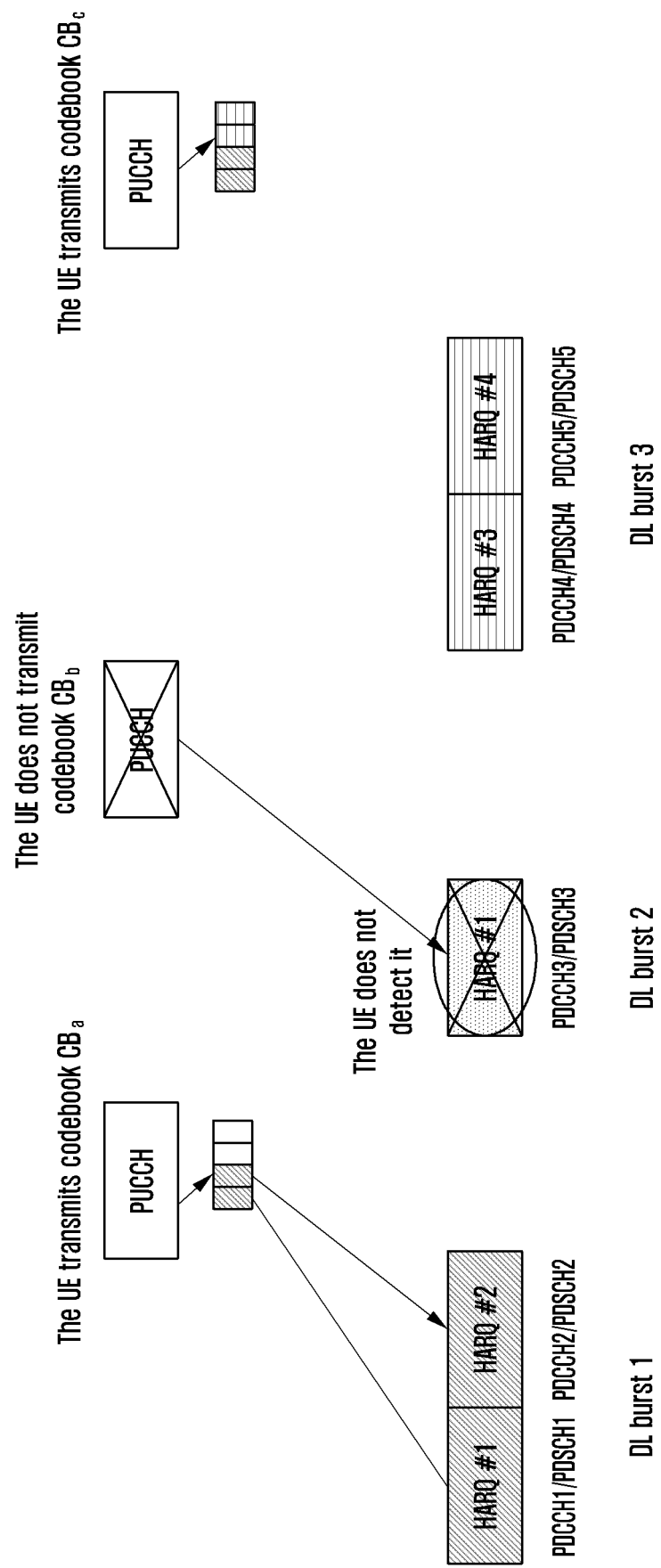

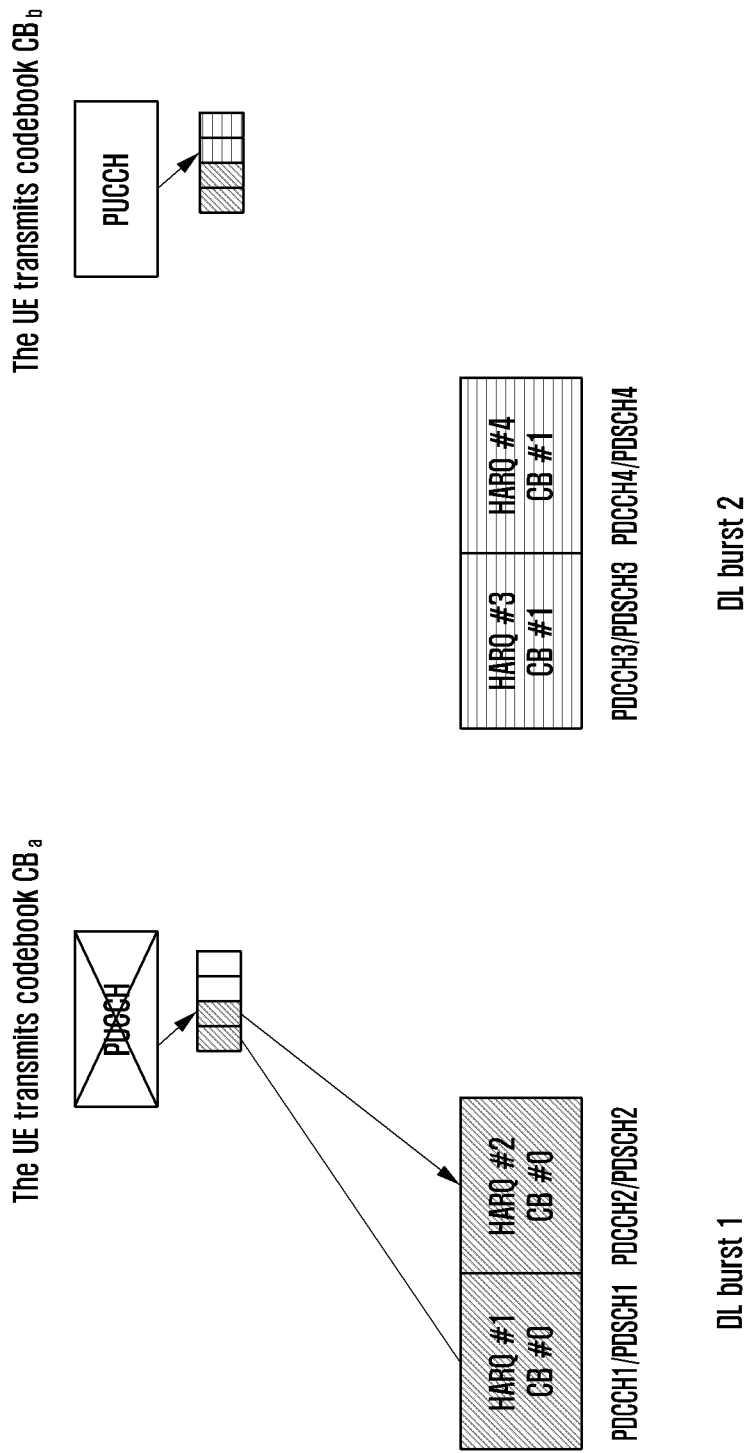

METHOD AND DEVICE FOR TRANSMITTING UPLINK CONTROL INFORMATION

TECHNICAL FIELD

The present invention relates to wireless communication system technologies, and in particular, to a method and device for transmitting uplink control information (UCI).

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

With the rapid development of the information industry, especially the growing demand from the mobile Internet and Internet of Things (IoT), it will bring an unprecedented challenge to future mobile communication technologies. In response to this unprecedented challenge, the communications industry and academia have launched extensive fifth-generation (5G) mobile communications technology research for 2020. According to the working plan of the 3GPP (3rd Generation Partnership Project) organization, works for the first phase of the 5G are already in process.

Downlink transmission refers to transmitting a signal from a base station to a user equipment (UE). The downlink signal include a data signal, a control signal and a reference signal (pilot). Here, the base station transmits downlink data in a physical downlink shared channel (PDSCH) or transmit downlink control information in a downlink control channel. Uplink transmission refers to transmitting a signal from a UE to a base station. The uplink signal also includes a data signal, a control signal and a reference signal. Here, the UE transmits an uplink data in a Physical Uplink Shared Channel (PUSCH) or transmit UCI in a Physical Uplink Control Channel (PUCCH). The base station may dynamically schedule PDSCH transmission and PUSCH transmission of the UE through a Physical Downlink Control Channel (PDCCH). The UCI carried on the PUCCH may be classified into multiple types, including hybrid automatic repeat request (HARQ) acknowledgement (HARQ-ACK) information, channel state indication information (CSI) information and scheduling request (SR), and so on.

In a 5G system, one slot can be divided into at most three parts, a DL part, an Unknown part, and a UL part, which hereinafter are referred to as slot patterns. The DL part may include ND OFDM symbols for downlink transmission, wherein ND is greater than or equal to 0; the UL part may include NU OFDM symbols for uplink transmission, wherein NU is greater than or equal to 0; The Unknown part may include NK OFDM symbols representing the unknown part, wherein NK is greater than or equal to 0, i.e. it is uncertain whether the uplink or downlink transmission has been performed on the Unknown part. In order to determine one slot pattern, one or more of the following four levels of indication methods may be employed.

The first level: a semi-statically configured slot pattern, which may be a common pattern of a cell or a group of UEs. For example, a pattern of each slot in one cycle is configured with Np slots as a cycle.

The second level: a semi-statically configured slot pattern, which may be a pattern configured respectively for each UE. For example, a pattern of each slot in one cycle is configured with Np slots as a cycle.

The third level: a dynamically-indicated slot pattern, which may be a common pattern of the cell or a group of UEs, for example, employing a common PDCCH. For example, a pattern of each slot in one cycle is configured with Np slots as a cycle; or, in one cycle, patterns of only one or more slots of Np slots are configured dynamically, while the parents of slots which are not dynamically configured may be determined according to other information, for example, a semi-statically configured slot pattern.

The fourth level: the dynamically-indicated slot pattern, which may be determined according to the PDCCH scheduling the uplink and downlink transmission of the UE. For example, an OFDM symbol that dynamically schedules the downlink transmission belongs to the DL part, and an OFDM symbol that dynamically schedules the uplink transmission belongs to the UL part.

When there is an inconsistency in the slot patterns indicated by the above four levels of indication methods, there may be a priority for defining the overload. For example, a simple method is that an OFDM symbol which is indicated as a DL part by a level cannot be indicated as a UL part by other levels; an OFDM symbol which is indicated as a UL part by a level cannot be indicated as the DL part by other levels; an OFDM symbol which is indicated as an Unknown part by a level can be further indicated as the DL part, the Unknown part or the UL part by a higher level (e.g., the second level is higher than the first level).

When a downlink data is transmitted based on HARQ, the requirement of the processing time from the last OFDM symbol of the PDSCH to the first OFDM symbol of the PUCCH may be different according to the processing capability of the UE. Depending on the type of the PDSCH, for example, the position of the DMRS, the processing time described above may also be different. Similarly, when an uplink data is transmitted based on HARQ, the requirement of the processing time from the last OFDM symbol of the PDCCH scheduling the PUSCH to the first OFDM symbol of the PUSCH may be different according to the processing capability of the UE. Depending on the type of the PUSCH, for example, the position of the DMRS, the processing time described above may also be different. In addition, the above processing time may be different for different cases such as transmitting only PUCCH, PUSCH, or multiplexed transmission of the PUCCH and PUSCH.

In the 5G system, for the downlink data transmission, the delay between the transmission of PDCCH and the transmission of its scheduled PDSCH is K0, wherein K0 is greater than or equal to 0. The delay between the transmission of PDSCH and the transmission of its corresponding HARQ-ACK is K1, wherein K1 is greater than or equal to 0. For example, the units of the above delays K0 and K1 may be slots. In the 5G system, the slot length of the DL BWP where the PDSCH is located and the slot length of the UL BWP where the PUCCH is located may be different. In the PDCCH which schedules the PDSCH, K1 may be set in units of the slot length of the UL BWP in which the PUCCH is located.

In one slot, the starting OFDM symbol and the number of OFDM symbols of the PDSCH of the UE scheduled by the base station may have one or more changes. As shown in FIG. 1, eight possible PDSCH resources 101 to 108 may be configured, and the starting OFDM symbol and/or the number of OFDM symbols of these PDSCH resources may be different. In addition, the base station also supports for allocating one PDSCH in N slots. For example, the time-frequency resources of the PDSCH in consecutive N slots may be the same. The above parameter K0, the starting OFDM symbol, the number of symbols or the parameter K1 may be configured and indicated respectively, or may be jointly configured and indicated. For example, the base station may configure G group of parameters (K0, starting OFDM symbol, number of symbols), wherein G is less than or equal to 16, and configure a plurality of possible values of K1. The above parameter group (K0, starting OFDM symbol, number of symbols) and parameter K1 may be indicated by occupying different fields in the PDCCH, respectively. In one slot, the base station possibly transmits a plurality of PDSCHs, and thus all need to feed back HARQ-ACK information. In addition, in order to flexibly utilize each spectrum resource, 5G still supports carrier aggregation. That is, the base station may configure multiple carriers for one User Equipment (UE), and correspondingly need to feed back HARQ-ACK information of multiple carriers. In addition, in order to improve the transmission efficiency of the HARQ-ACK, a retransmission mechanism of the HARQ-ACK may be introduced. For effectively supporting HARQ-ACK transmission, a new solution is needed.

Solution to Problem

To achieve the above purpose, the present application employs the following technical solutions: a method for transmitting uplink control information (UCI), comprising:

a user equipment (UE) detects a physical downlink control channel (PDCCH) and receives a physical downlink shared channel (PDSCH) scheduled by the PDCCH;

the UE determines the hybrid automatic repeat request acknowledge (HARQ-ACK) information to be fed back and physical uplink control channel (PUCCH) resource for transmitting the UCI according to at least one of the following: slot lengths of downlink bandwidth part (BWP) and uplink BWP, HARQ-ACK codebook information, a starting Orthogonal Frequency Division Multiplexing symbol of the PUCCH resource for feeding back the UCI and UE's processing capability requirements;

transmitting, by the UE, the HARQ-ACKL information on the PUCCH resource.

Preferably, the determining PUCCH resource for transmitting the UCI, comprising at least one of the following:

if the UE receives at least one PDCCH, an ending time of the PDCCH is not later than a time when the UE starts to prepare to feed back the HARQ-ACK on an A1, and an PRI (ACK/NACK Resource Indicator) field of the PDCCH indicates an A2, then the UE determines that the PUCCH resource for transmitting the UCI is the a2;

if the UE does not receive the PDCCH indicating the A2 before the UE starts to prepare to feed back the HARQ-ACK on the A1, then the UE determines that the PUCCH resource for transmitting the UCI is the A1;

wherein, the A1 and A2 are two PUCCH resources in a same slot, and the starting OFDM symbol of the A1 is earlier than the starting OFDM symbol of the A2.

Preferably, the determining PUCCH resource for transmitting UCI, comprising:

if the starting OFDM symbol of the A2 is not later than the starting OFDM symbol of the A1, then the UE feeds back the HARQ-ACK information on the A2, wherein, the A1 and A2 are two PUCCH resources in a same slot, and the UE receives the PDCCH indicating the A1 first and receives the PDCCH indicating the A2 later.

Preferably, the determining the PUCCH resource for transmitting the UCI, comprising:

for all PDSCHs whose interval between the ending OFDM symbol and the starting OFDM symbol of the earliest PUCCH resource is no less than a threshold T, determining that the PUCCH resource for transmitting the UCI is a first PUCCH resource;

for the PDSCHs whose interval between the ending OFDM symbol and the starting OFDM symbol of the earliest PUCCH resource is less than a threshold T, determining that the PUCCH resource for transmitting the UCI is a second PUCCH resource, wherein, the first PUCCH resource and the second PUCCH resource are two PUCCH resources in a same slot.

Preferably, the determining the PUCCH resource for transmitting the UCI, comprising:

for all PDSCHs that satisfy the processing delay of feeding back the HARQ-ACK on the PUCCH of the starting OFDM symbol S1, determining that the PUCCH resource for transmitting the UCI is the first PUCCH resource, for the PDSCHs that do not satisfy the processing delay of feeding back the HARQ-ACK on the PUCCH of the starting OFDM symbol S1, determining that the PUCCH resource for transmitting the UCI is the second PUCCH resource, wherein, the starting OFDM symbol of the earliest PUCCH resource is S1, and the first PUCCH resource and the second PUCCH resource are two PUCCH resources in a same slot.

Preferably, the determining the PUCCH resource for transmitting the UCI, comprising:

assuming that one PDSCH belongs to one HARQ-ACK codebook, a set of PUCCH resources is determined according to the number of bits of all HARQ-ACKs belonging to this HARQ-ACK codebook including this PDSCH, and one PUCCH resource of this set of PUCCH resources is indicated according to the PRI of this PDCCH of this PDSCH;

if the interval between the last OFDM symbol of the PDSCH and the first OFDM symbol of the PUCCH resource is not less than a threshold T2, then the PDSCH belongs to the HARQ-ACK codebook; otherwise, the PDSCH belongs to another HARQ-ACK codebook.

Preferably, the determining the HARQ-ACK information to be fed back, comprising:

allocating the HARQ-ACK positions according to the slot length $\mu_{DL}$ of the DL BWP where the PDSCH is located and the slot length $\mu_{UL}$ of the UL BWP where the PUCCH is located, the one HARQ-ACK position carrying the HARQ-ACK information of one PDSCH.

Preferably, wherein the allocating the HARQ-ACK positions according to the slot length $\mu_{DL}$ of the DL BWP where the PDSCH is located and the slot length $\mu_{UL}$ of the UL BWP where the PUCCH is located, comprising:

assuming that $\mu_{UL} \geq \mu_{DL}$, for the slot n where the PUCCH is located and for the delay value K1 from the PDCCH to the scheduled PDSCH, allocating the HARQ-ACK positions to the M slots M·(n-K1)+m, wherein m=0,1, . . . M-1 of the DL BWP, wherein, M=$\mu_{UL}/\mu_{DL}$.

Preferably, further comprising:

for each slot M·(n-K1)+m, wherein m=0,1, . . . M-1 of the DL BWP, the HARQ-ACK positions are determined respectively and cascaded as the HARQ-ACK positions corresponding to the slot n of the UL BWP and the value of K1; or for each slot M·(n-K1)+m, wherein m=0,1, . . . M-1 of the DL BWP, the HARQ-ACK positions are determined, and the HARQ-ACK positions corresponding to the slot n of the UL BWP and the value of K1 are obtained according to the maximum of the number of the HAQR-ACK positions of the M slots; or only for the slot M·(n-K1)+q, wherein q=0 of the DL BWP, the HARQ-ACK positions are determined as the HARQ-ACK position corresponding to the slot n and the value of K1 of the UL BWP.

Preferably, wherein the allocating the HARQ-ACK positions according to the slot length $\mu_{DL}$ of the DL BWP where the PDSCH is located and the slot length $\mu_{UL}$ of the UL BWP where the PUCCH is located, comprising:

assuming $\mu_{UL} < \mu_{DL}$, only when n-K1-M+1 is divisible by M, the slot set $K_L$ on the DL BWP to be allocated the HARQ-ACK positions includes the slot (n-K1-M+1)/M, K1∈K, K is a set of K1, and the HARQ-ACK positions are determined for each slot of the set $K_L$.

Preferably, wherein the allocating of the HARQ-ACK positions according to the slot length $\mu_{DL}$ of the DL BWP where the PDSCH is located and the slot length $\mu_{DL}$ of the UL BWP where the PUCCH is located, comprising:

assuming $\mu_{UL} < \mu_{DL}$, according to the set K of K1, determining that the slot set on the DL BWP to be allocated the HARQ-ACK positions is $K_d$=floor((n-K1)/M), wherein, K1∈K, and determining the HARQ-ACK positions for each slot $k_d$ of the set $K_D$, wherein, M=$\mu_{DL}/\mu_{UL}$.

Preferably, further comprising:

allocating the HARQ-ACK positions to each slot $k_d$ of the set $K_D$, according to the slot division of the UL BWP, for the PDSCH whose last OFDM symbol is within the slot M·kd+q, wherein 0≤q<M, even if there is no K1 in the set K such that M·kd+q+K1=n, still allocating the HARQ-ACK positions to this PDSCH; or allocating the HARQ-ACK positions to each slot $k_d$ of the set $K_D$, according to the slot division of the UL BWP, for the PDSCH whose last OFDM symbol is within the slot M·kd+q, wherein 0≤q<M only when there is K1 in the set K such that M·kd+q-K1=n, allocating the HARQ-ACK positions to this PDSCH.

Preferably, the determining the HARQ-ACK information to be fed back, comprising: determining the HARQ-ACK codebook according to the at least one type of information:

HARQ-ACK codebook number;

HARQ-ACK codebook set to be fed back;

a total number of DL assignment indicators (T-DAI) and/or counter of DAI (C-DAI) determined according to the HARQ-ACK codebook set to be fed back;

T-DAI and/or C-DAI determined according to a latest HARQ-ACK codebook to be fed back, and a size of another codebook in the HARQ-ACK codebook set to be fed back determined according to a value which is predefined or configured by a higher layer signaling.

Preferably, the determining the HARQ-ACK codebook, comprises: for one PDSCH of a same HARQ process, if the HARQ-ACK of the PDSCH has not been transmitted, determining the value of the HARQ-ACK according to a decoding result of the PDSCH in the latest HARQ-ACK feedback; if the HARQ-ACK of the PDSCH has been transmitted and a timer timed out, the value of the HARQ-ACK of the PDSCH being a predefined value, otherwise, determining the HARQ-ACK value according to the decoding result of the PDSCH.

Preferably, the determining the HARQ-ACK codebook, comprises:

for multiple PDCCHs whose HARQ-ACK codebook index are the same, the codebook set to be transmitted together indicated in the PDCCH being the same.

Preferably, the determining the HARQ-ACK codebook, comprises:

for multiple PDCCHs whose HARQ-ACK codebook index are the same, the HARQ-ACK timing information of any one PDSCH scheduled by the PDCCH is determined by HARQ-ACK timing information indicated by another PDCCH.

A user equipment, comprising a PDCCH and PDSCH receiving module, an HARQ-ACK information generating and PUCCH resource determining module, and an HARQ-ACK transmitting module, wherein:

the PDCCH and PDSCH receiving module, configured to detect a PDCCH and receive a PDSCH scheduled by the PDCCH;

the HARQ-ACK information generating and PUCCH resource determining module is configured to determine HARQ-ACK information to be fed back and the PUCCH resource for transmitting UCI according to slot lengths of downlink BWP and uplink BWP, HARQ-ACK codebook information, a starting OFDM symbol of the PUCCH resource for feeding back the UCI and/or UE's processing capability requirements;

the HARQ-ACK transmitting module, configured to transmit the HARQ-ACK on the PUCCH resource.

In addition, one user equipment, comprises a PDCCH and PDSCH receiving module, an HARQ-ACK information generating and PUCCH resource determining module, and an HARQ-ACK transmitting module, wherein:

the PDCCH and PDSCH receiving module is configured to detect a PDCCH and receive a PDSCH scheduled by the PDCCH;

the HARQ-ACK information generating and PUCCH resource determining module is configured to determine hybrid automatic repeat request acknowledge (HARQ-ACK) information to be fed back and a PUCCH resource for transmitting uplink control information (UCI) according to at least one of the following: slot lengths of downlink BWP and uplink BWP, HARQ-ACK codebook information, a starting Orthogonal Frequency Division Multiplexing (OFDM) symbol of the PUCCH resource for feeding back the UCI and UE's processing capability requirements;

the HARQ-ACK transmitting module, configured to transmit a HARQ-ACK on the PUCCH resource.

A user equipment (UE), comprising:

a processor; and a memory, the memory storing computer executable instructions that, when executed by the processor, cause the UE to perform the above method.

A computer readable medium having stored thereon instructions that, when executed by a processor, cause the processor to perform the above method.

The method of the present invention determines the HARQ-ACK information to be fed back and the PUCCH resource according to the processing capability of the UE, avoids the complexity of the UE feeding back the UCI, and provides a method for generating a semi-static HARQ-ACK codebook that supports multiple slot lengths.

Advantageous Effects of Invention

The present application provides a method and device for transmitting uplink control information, to improve the transmission efficiency of the HARQ-ACK, which includes supporting transmission of multiple PUCCHs in one slot to reduce the delay of the HARQ-ACK feedback, supporting the retransmission of the HARQ-ACK to improve the probability of right reception and supporting the HARQ-ACK transmission in multiple slot lengths to improve the flexibility of the system.

BRIEF DESCRIPTION OF DRAWINGS

FIG. 9b is a schematic diagram of determining one or more HARQ-ACK codebooks according to various embodiment of the disclosure;

FIG. 10c is a schematic diagram of determining one or more HARQ-ACK codebooks according to various embodiment of the disclosure;

MODE FOR THE INVENTION

In order to make the purpose, technical solutions and advantages of the present invention clearer, the present invention will be further described in detail below by illustration of embodiments with reference to the accompanying drawings.

Figure 1:
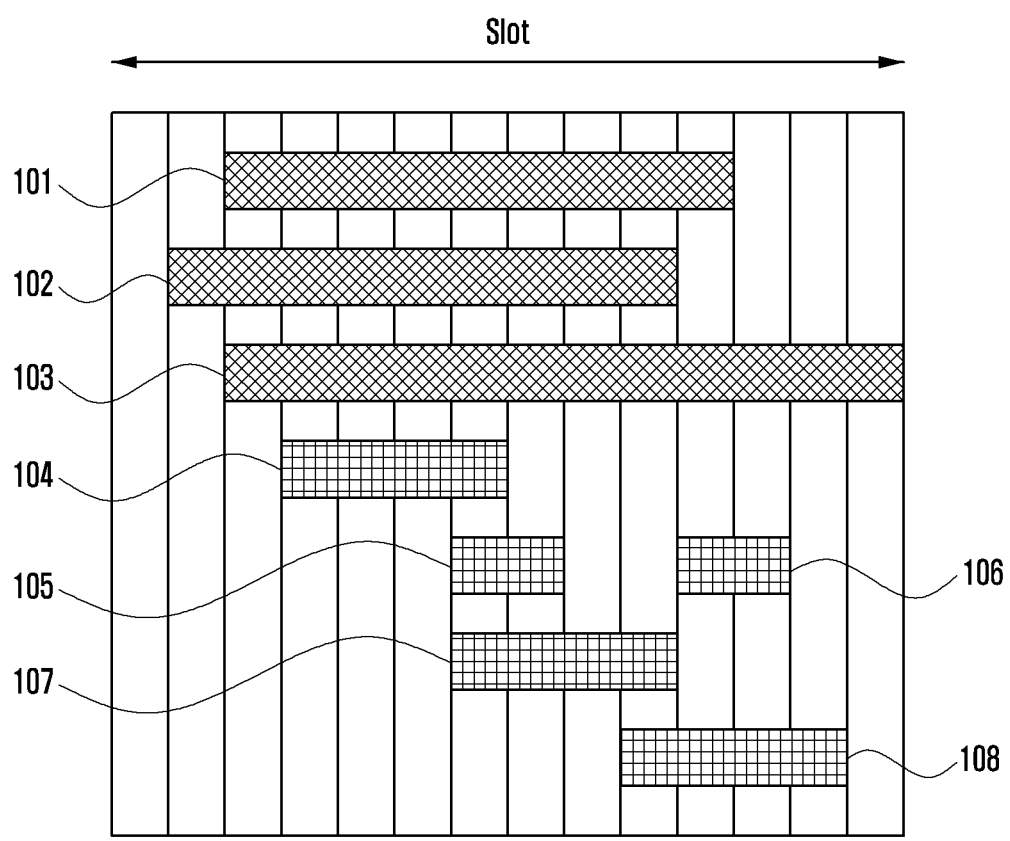
FIG. 1 is a schematic diagram of a PDSCH time resource.
Figure 2:
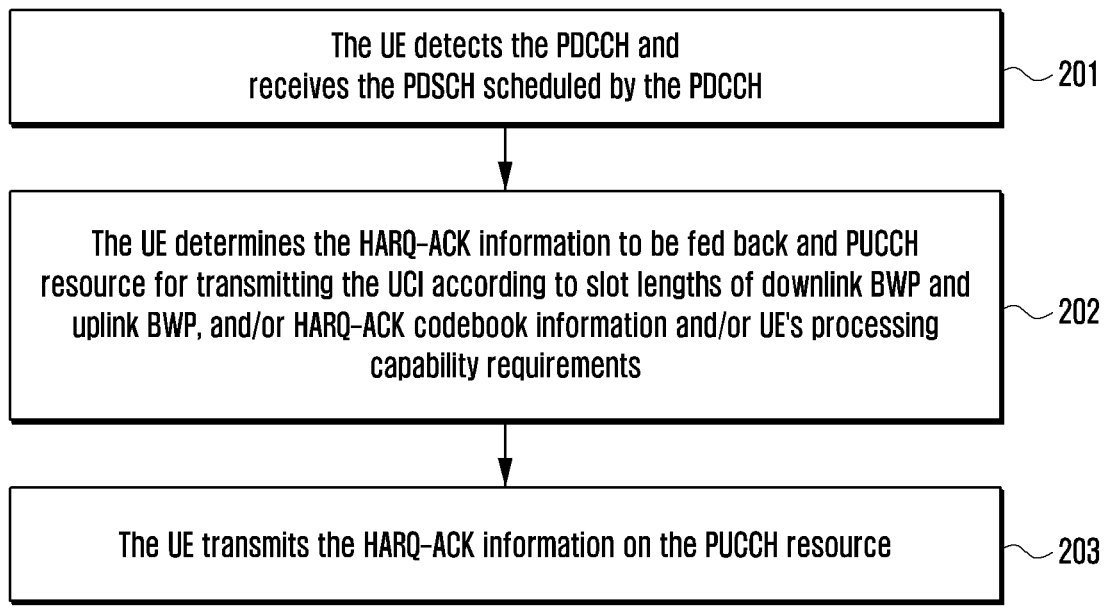
FIG. 2 is a flowchart of a method for transmitting uplink control information according to an embodiment of the present invention.

For downlink data transmission, in order to feed uplink control information (UCI) back such as HARQ-ACK, FIG. 2 is a flowchart of the present invention.

Step 201: The UE detects the PDCCH and receives the PDSCH scheduled by the PDCCH.

Step 202: The UE determines the HARQ-ACK information to be fed back and PUCCH resources for transmitting UCI according to at least one of the following: slot lengths of downlink bandwidth part (BWP) and uplink BWP, HARQ-ACK codebook information, a starting Orthogonal Frequency Division Multiplexing (OFDM) symbol of the PUCCH resource for feeding back UCI and UE's processing capability requirements.

The UE may determine the HARQ-ACK information of which PDSCH may be transmitted on a same PUCCH resource according to the starting OFDM symbol of the PUCCH resource for feeding back UCI.

The UE may determine HARQ-ACK information of which PDSCH may be transmitted on a same PUCCH resource according to the starting OFDM symbol of the PUCCH resource for feeding back UCI and the UE's processing capability requirements.

The UE may determine the HARQ-ACK positions to be allocated for the PDSCH on the DL BWP according to the slot lengths of the downlink BWP and the uplink BWP. Each HARQ-ACK position may carry HARQ-ACK information of one PDSCH. The UE may receive the PDSCH corresponding to one HARQ-ACK position, which carry the HARQ-ACK information of the PDSCH; or, the UE may not receive any PDSCH corresponding to one HARQ-ACK position, and the UE may fill some HARQ-ACK bits, for example, a NACK.

The UE may determine the HARQ-ACKs of which PDSCHs may be transmitted in a same codebook or in a same PUCCH/PUSCH according to the HARQ-ACK codebook information.

Step 203: The UE transmits the HARQ-ACK information on the PUCCH resource.

The method for transmitting the UCI according to the present invention will be described below with reference to the embodiments.

Embodiment 1

When allocating the PUCCH resources, the N sets of PUCCH resources may be configured by a higher layer signaling. A set of PUCCH resources is selected according to the number of the UCI bits, and one PUCCH resource in the selected set is indicated by the PRI. It is assumed that the first set of PUCCH resources are only used to carry 1 or 2 HARQ-ACK bits, for example, PUCCH format 0 and/or PUCCH format 1 of the New Radio (NR) system. The range of the number of UCI bits carried by the $k^{th}$ set of PUCCH resources is $(N_{k-1}, N_K]$, wherein, $k=2, 3, \ldots, N$, and N1 is equal to 2, and $N_k$ monotonically increases with k. $N_k$ may be predefined or configured by the higher layer signaling. For example, for the $k^{th}$ set of PUCCH resources, it may be PUCCH format 2, PUCCH format 3, and/or PUCCH format 4 of the NR system.

For HARQ-based downlink data transmission, one PUCCH resource may carry HARQ-ACK information of one or more PDSCHs. For a plurality of PDSCHs that feed back HARQ-ACK on a same PUCCH resource, the PUCCH resources indicated by the PRIs of the corresponding PDCCHs may be changed. For example, a set of PUCCH resources is determined according to the number of HARQ-ACK bits to be fed back by all scheduled PDSCHs up to the current time, and one PUCCH resource of the one set of PUCCH resources is indicated by the PRI, so that the PUCCH resources and the number of HARQ-ACK bits is related to the PRI. In particular, the starting OFDM symbols of the above PUCCH resources may be different.

Figure 3:
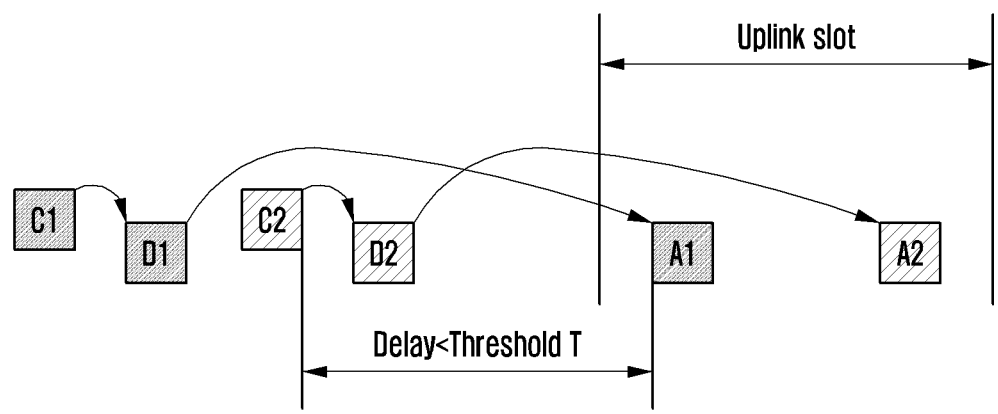
FIG. 3 is a schematic diagram 1 of determining a PUCCH resource carrying an HARQ-ACK.

As shown in FIG. 3, the UE schedules PDSCH D1 (hereafter abbreviated as D1), and the PRI of PDCCH C1 (hereafter abbreviated as C1) that schedules D1 indicates the PUCCH resource A1. The UE schedules PDSCH D2 (hereafter abbreviated as D2), and the PRI of PDCCH C2 (hereafter abbreviated as C2) that schedules D2 indicates the PUCCH resource A2. The UE first receives D1 and then receives D2. The starting OFDM symbol of the A1 is earlier than the starting OFDM symbol of the A2. Here, the base station actually instructs the UE to transmit the HARQ-ACK on the A2. On the UE side, it is assumed that the time when the UE receives the C2 is later than the time when the UE starts to prepare to feed back the HARQ-ACK on the A1, the UE does not receive the C2 while the UE start to prepare to feed back the HARQ-ACK on the A1, and thus the UE also does not know that the base station also schedules D2 and instructs the UE to simultaneously feed back the HARQ-ACK of D1 and D2 on A2. In order to feed back HARQ-ACK on A2, the UE has to abandon the preparation for A1 and restarts to prepare to transmit HARQ-ACK on A2, but this causes additional UE implementation complexity.

In general, the two most recent PUCCH resources for feedback of HARQ-ACK received by the UE are denoted as an A1 and an A2, and the starting OFDM symbol of the A1 is earlier than the starting OFDM symbol of the A2. When the UE receives at least one PDCCH, the ending time of the PDCCH is at least a threshold T earlier than the starting time of the A1, and the PRI field of the PDCCH indicates the A2, the UE feeds back all the HARQ-ACK information on the A2, wherein the threshold T may be equal to the time when the UE prepares to feed back HARQ-ACK on the A1. When the UE does not receive any PDCCH indicating the A2, the ending time of the PDCCH is at least a time period T earlier than the starting time of the A1, and the set of HARQ-ACK information of the PDSCH scheduled by PDCCH indicating the A2 is denoted as H, then the UE feeds back other HARQ-ACK information on the A1 except for the set H.

Figure 4:
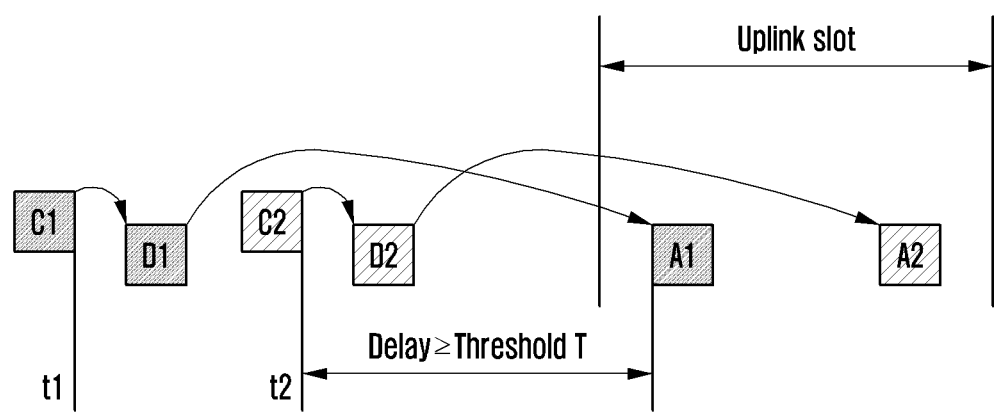
FIG. 4 is a schematic diagram 2 of determining a PUCCH resource carrying an HARQ-ACK.
Figure 5:
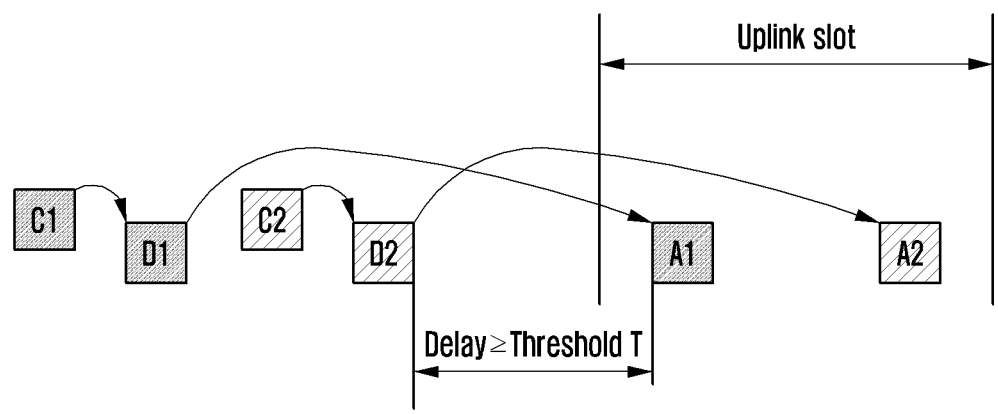
FIG. 5 is a schematic diagram 3 of determining a PUCCH resource carrying an HARQ-ACK.

As shown in FIG. 4, there is at least one PDCCH C2, which schedules D2 and indicates A2, and the interval between the ending time of C2 and the starting time of A1 is greater than or equal to the threshold T, and the UE feeds back HARQ-ACK information on A2. Alternatively, as shown in FIG. 5, it may be that at least one PDSCH D2 exists, the PDCCH scheduling D2 indicates A2, and the interval between the ending time of D2 and the starting time of A1 is greater than or equal to the threshold T, then the UE feeds back HARQ-ACK information on A2. Alternatively, when there is at least one PDCCH C2, which schedules PDSCH D2 and indicates A2, the interval between the ending time of C2 and the starting time of A1 is greater than or equal to T, and when the interval between the ending time of D2 and the starting time of A1 is greater than or equal to T, the UE feeds back HARQ-ACK information on A2. The above threshold T may be determined according to the PDSCH processing time N1, that is, the delay from the last OFDM symbol of the PDSCH to the first OFDM symbol of the PUCCH carrying the HARQ-ACK. For example, the PDSCH processing time is defined in Table 5.3-1 of the 3GPP standard 38.214. The threshold T may be equal to N1+d1, wherein d1 is an offset of the processing delay, and d1 may be related to factors such as the type of the PDSCH, the DMRS position, and the like, and d1 is also related to whether the HARQ-ACK is carried by the PUCCH or the PUSCH. Alternatively, the threshold T may be determined according to the PUSCH preparation time N2, that is, the delay from the last OFDM symbol of the PDCCH scheduling the PUSCH to the first OFDM symbol of the PUSCH. For example, the PUSCH preparation time is defined in Table 6.4-1 of the 3GPP standard 38.214. The above threshold T may be equal to N2+d2, wherein d2 is an offset of the preparation time, and d2 may be related to factors such as the DMRS position of the PUSCH.

With the above method, the UE can know in advance that the HARQ-ACK information needs to be transmitted on the A2, thereby avoiding the preparation of the HARQ-ACK transmission on the A1. On the base station side, in order to prevent the UE from losing one or more PDCCHs and their scheduled PDSCHs, the base station may transmit X PDCCHs and their scheduled PDSCHs, and the X PDCCHs are at least a time period T earlier than the starting time of A1. Thus, even if the UE loses X-1 PDCCHs, the UE can still know to feed back HARQ-ACK information on the A2. The above parameter X may be predetermined, configured by the high-layer signaling, or may also be determined by the base station.

In addition, the two PUCCH resources received by the UE for feeding back the HARQ-ACK are denoted as an A1 and an A2, and the UE first receives the PDCCH indicating the A1, and then receives the PDCCH indicating the A2. The starting OFDM symbol of the A2 may be limited no later than the starting OFDM symbol of A1, the UE feeds back the HARQ-ACK information on A2. With this method, even if the base station changes the PUCCH resource for carrying the HARQ-ACK, the starting OFDM symbol of the changed PUCCH resource does not change or becomes earlier according to the change of the number of HARQ-ACK bits, so that the UE does not prepare the HARQ-ACK transmission in accordance with the previous PUCCH. With this method, all PDSCHs that can feed back HARQ-ACK on the current PUCCH are schedulable.

Embodiment 2

In one slot, multiple PUCCHs may be transmitted in a Time Division Multiplex (TDM) method, and multiple PUCCHs may carry HARQ-ACK. A typical scenario is that one PUCCH is used to feedback an HARQ-ACK of enhanced mobile broadband service (eMBB), and the HARQ-ACK it carries may be derived from the scheduling PDSCH that feeds back HARQ-ACK on this PUCCH within a longer time window; the other PUCCH is used to feed back an HARQ-ACK of Ultra Reliable Low Latency Communications (URLLC). For PUCCH for feedback of HARQ-ACK of URLLC, due to the low latency requirement, the fed back HARQ-ACK is generally only derived from the scheduling PDSCH that feeds back HARQ-ACK on this PUCCH within a shorter time window. In particular, in this shorter time window, only one PDSCH that feeds back HARQ-ACK on this PUCCH may be scheduled. Another typical scenario is that multiple PUCCHs are transmitted in one uplink slot, and in order to ensure the low delay and low coding rate, the HARQ-ACKs of multiple PDSCHs of the URLLC service are transmitted on the respective PUCCHs sequentially.

In order to distinguish the multiple PUCCHs for feeding back HARQ-ACK in one slot, the PDCCH scheduling one PDSCH is used to indicate the HARQ-ACK codebook for feedbacking the HARQ-ACK of the PDSCH, so as to determine the corresponding PUCCH. For example, it is possible to add X bit of information in the DCI format to indicate $2^X$ HARQ-ACK codebooks, for example, adding of 1 bit of information to distinguish 2 HARQ-ACK codebooks. The PDSCH scheduled by all DCIs having the same 1 bit of information feeds back HARQ-ACK in a same HARQ-ACK codebook. If there are at most two PUCCHs in one uplink slot, the two HARQ-ACK codebooks correspond to two PUCCHs respectively. Alternatively, it is also possible to use the existing information field in the DCI format to define a special value of one or more existing information fields for distinguishing the HARQ-ACK codebooks, so as to determine the PUCCH. For example, by using the time domain resource assignment in the DCI, all the values can be divided into two sets, and the PDSCH scheduling corresponding to each set of values employs the same PUCCH. For example, a set of values indicates a relatively small K0 and PDSCH type B, so that the demand is mainly for URLLC; another set of values is mainly used for eMBB. For another example, one set of values indicates the relative smaller indexes of starting point symbol and/or ending symbol of PDSCH in one slot, and the other set of values indicates the relative larger indexes of starting point symbol and/or ending symbol of PDSCH in one slot. Alternatively, two C-RNTIs may be configured for the UE, and the PDSCH scheduled by a same C-RNTI feeds back the HARQ-ACK in a same PUCCH. Alternatively, by using the PRI field in the DCI, all the values of the PRI may be divided into two sets, and the PDSCH scheduling corresponding to each set of values employs a same PUCCH.

In order to distinguish the two PUCCHs feeding back HARQ-ACK in one slot, attributes may be set for each PUCCH resource for feeding back UCI. The above attribute may be one-bit information indicating that the HARQ-ACK information of the PDSCH scheduled by the PDCCH of the PUCCH having the same attribute is fed back in a same PUCCH. The above attributes may be other information, for example, a spatial feature of one PUCCH resource, such as QCL information, indicating that the HARQ-ACK information of the PDSCH scheduled by the PDCCH of the PUCCH having the same spatial feature is fed back in a same PUCCH. The above attribute information may be semi-statically configured by higher layer signaling.

Embodiment 3

The essence of the above method of Embodiment 2 is to explicitly indicate the PUCCH for feeding back the HARQ-ACK. To reduce the signaling overhead, for one PDSCH, the PUCCH for feeding back the HARQ-ACK may be required to be impliedly determined according to the processing time requirement of the UE. The configured set of all the PUCCH resources of the UE for feeding back HARQ-ACK is denoted as KA, the configured set of all the PUCCH resources of the UE for feeding back CSI is denoted as KC, and the configured set of all the PUCCH resources of the UE for feeding back SR are denoted as KS. The method for dividing the HARQ-ACK fed back on two PUCCHs of the present invention is described below.

Figure 6:
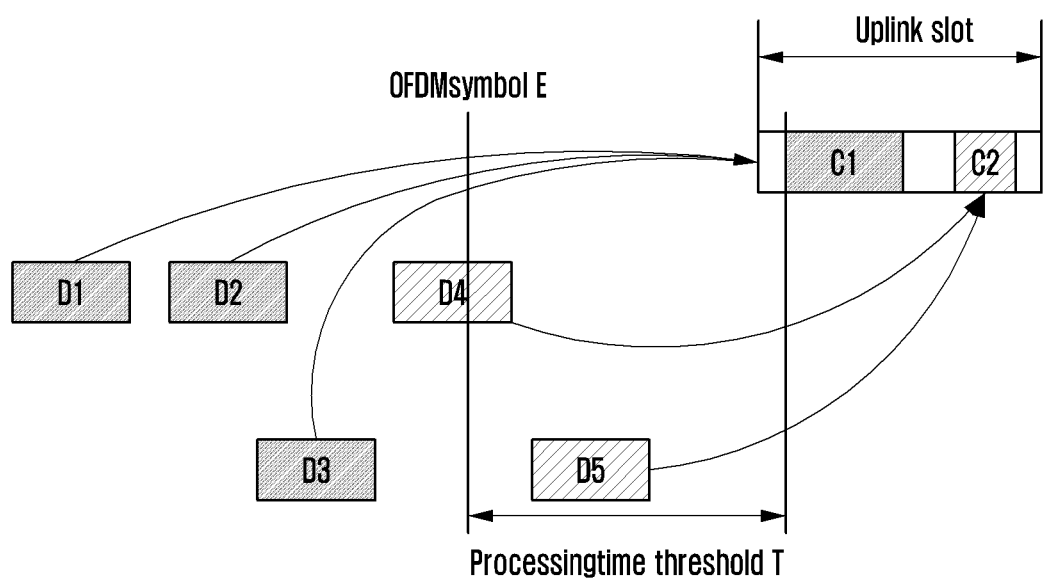
FIG. 6 is a schematic diagram of determining HARQ-ACKs carried by two PUCCHs.

The first method for dividing the HARQ-ACK fed back on two PUCCHs is that: for the PDSCH that feeds back HARQ-ACK in one slot, for the PDSCH whose interval from all the ending OFDM symbols to the starting OFDM symbols of the earliest PUCCH resource in the set K is not less than the threshold T, its HARQ-ACK is transmitted by occupying the same PUCCH resource; the other PDSCH feeds back HARQ-ACK on the other PUCCH. As shown in FIG. 6, the reference OFDM symbol E may be determined according to the threshold T, and all the ending OFDM symbols transmit HARQ-ACK on a same PUCCH (C1) resource no later than the PDSCHs (D1, D2, D3) of the reference OFDM symbol E. Other PDSCHs (D4, D5) transmit HARQ-ACKs on a same PUCCH (C2) resource. The starting OFDM symbol of the earliest PUCCH resource in the set K is S1, and the interval between the reference OFDM symbol E and the OFDM symbol S1 is equal to the threshold T. The above threshold T may be determined according to the PDSCH processing time N1, that is, the delay from the last OFDM symbol of the PDSCH to the first OFDM symbol of the PUCCH carrying the HARQ-ACK. For example, the PDSCH processing time is defined in Table 5.3-1 of the 3GPP standard 38.214. The threshold T may be equal to N1+d1, wherein d1 is the offset of the processing delay, and d1 may be related to factors such as the type of the PDSCH, the DMRS position, and the like, and d1 is also related to whether HARQ-ACK is carried by the PUCCH or the PUSCH. Alternatively, the threshold T may be determined according to the PUSCH preparation time N2, that is, the delay from the last OFDM symbol of the PDCCH scheduling the PUSCH to the first OFDM symbol of the PUSCH. For example, the PUSCH preparation time is defined in Table 6.4-1 of the 3GPP standard 38.214. The above threshold T may be equal to N2+d2, wherein d2 is the offset of the preparation time, and d2 may be related to factors such as the DMRS position of the PUSCH and the like. The above set K may be equal to KA; or, the set K may be equal to the union of KA and KS; or, the set K may be equal to the union of KA, KS and KC.

The second method for dividing the HARQ-ACK fed back on two PUCCHs is that: for the PDSCH that feeds back the HARQ-ACK in one slot, and for one set K of the PUCCH resources, the starting OFDM symbol of the earliest PUCCH resource in the set K is S1, all PDSCHs that can feed back HARQ-ACK on the PUCCH of the starting OFDM symbol S1 occupy a same PUCCH to feed back HARQ-ACK. The other PDSCHs feed back HARQ-ACK on the other PUCCH. For a PDSCH, assuming that the interval between the last OFDM symbol of the PDSCH and the OFDM symbol S1 is greater than or equal to the UE processing time requirement T1, the PDSCH may feed back the HARQ-ACK on the PUCCH of the starting OFDM symbol S1. The above set K may be equal to KA; or, the set K may be equal to the union of KA and KS; or, the set K may be equal to the union of KA, KS and KC. The above threshold T1 may be determined according to the PDSCH processing time N1, that is, the delay from the last OFDM symbol of the PDSCH to the first OFDM symbol of the PUCCH carrying the HARQ-ACK. For example, the PDSCH processing time is defined in Table 5.3-1 of the 3GPP standard 38.214. The threshold T1 may be equal to N1+d1, wherein d1 is the offset of the processing delay, and d1 may be related to the factors such as type of the PDSCH, the DMRS position, and the like, and d1 is also related to whether HARQ-ACK is carried by the PUCCH or the PUSCH. Alternatively, the threshold T1 may be determined according to the PUSCH preparation time N2, that is, the delay from the last OFDM symbol of the PDCCH scheduling the PUSCH to the first OFDM symbol of the PUSCH. For example, the PUSCH preparation time is defined in Table 6.4-1 of the 3GPP standard 38.214. The above threshold T1 may be equal to N2+d2, wherein d2 is the offset of the preparation time, and d2 may be related to factors such as the DMRS position of the PUSCH.

A third method for dividing the HARQ-ACK fed back on two PUCCHs is to divide one or two HARQ-ACK codebooks according to the starting OFDM symbol of the PUCCH resource and the UE processing time requirement. For a PDSCH that feeds back HARQ-ACK in one slot, assuming that the PDSCH belongs to one HARQ-ACK codebook, a set of PUCCH resources is determined according to the number of bits of all HARQ-ACKs belonging to the HARQ-ACK codebook including the PDSCH and one PUCCH resource of the set of PUCCH resources is indicated according to the PRI of the PDCCH of this PDSCH. If the interval between the last OFDM symbol E of this PDSCH and the first OFDM symbol S1 of this PUCCH resource is not less than the threshold T2, then this PDSCH belongs to this HARQ-ACK codebook. Otherwise, this PDSCH belongs to the other HARQ-ACK codebook, and a set of PUCCH resources is determined according to the number of bits of all HARQ-ACKs belonging to the other HARQ-ACK codebook including this PDSCH, and the one PUCCH resource of this set of PUCCH resources is indicated according to the PRI of the PDCCH of this PDSCH. The above threshold T2 may be determined according to the PDSCH processing time N1, that is, the delay from the last OFDM symbol of the PDSCH to the first OFDM symbol of the PUCCH carrying the HARQ-ACK. For example, the PDSCH processing time is defined in Table 5.3-1 of the 3GPP standard 38.214. The threshold T2 may be equal to N1+d1, wherein d1 is the offset of the processing delay, and d1 may be related to factors such as the type of the PDSCH, the DMRS position, and the like, and d1 is also related to whether the HARQ-ACK is carried by the PUCCH or the PUSCH. Alternatively, the threshold T2 may be determined according to the PUSCH preparation time N2, that is, the delay from the last OFDM symbol of the PDCCH scheduling the PUSCH to the first OFDM symbol of the PUSCH. For example, the PUSCH preparation time is defined in Table 6.4-1 of the 3GPP standard 38.214. The above threshold T2 may be equal to N2+d2, wherein d2 is the offset of the preparation time, and d2 may be related to factors such as the DMRS position of the PUSCH and the like.

Embodiment 4

In order to improve the reception performance of the UCI, multiple opportunities may be provided for the base station to receive the UCI by means of UCI retransmission. If the uplink slot for the UCI retransmission need to transmit other new UCI, the retransmitted UCI and the new UCI may be transmitted together. In this case, it is necessary to avoid that another UCI cannot be received correctly caused by one erroneous UCI.

Taking the UCI containing the HARQ-ACK information as an example, the HARQ-ACK to be retransmitted is recorded as $UCI_a$, its corresponding HARQ-ACK codebook is recorded as $CB_a$; the HARQ-ACK to be newly-transmitted is $UCI_b$, its corresponding HARQ-ACK codebook is recorded as $CB_b$. The $UCI_a$ and $UCI_b$ are transmitted together in a same PUCCH or a PUSCH to generate a new codebook $CB_n$.

For a dynamic codebook, the new codebook $CB_n$ may be a cascade of $CB_a$ and $CB_b$; for a semi-static codebook, the new codebook may be a union of $CB_a$ and $CB_b$. The base station may configure the UE to work in which codebook type by a higher layer signaling or to switch dynamically between two codebooks, for example, indicating the UE to work in which codebook type by DCI. One typical scenario is that: while attempting to transmit the HARQ-ACK first time, the dynamic codebook is used; when retransmitting, the semi-static codebook is used; or, the DCI for scheduling PDSCH, the DCI for scheduling PUSCH, and/or dedicated DCI for triggering HARQ-ACK transmission correspond to different codebook types, respectively; or, different DCI formats correspond to different the codebook types, for example, the codebook type corresponding to the DCI in the normal mode is different from that corresponding to the DCI in the fallback mode.

In some conditions, for codebooks $CB_a$ and/or $CB_b$, the base station and the UE may have different understandings of this codebook, there are at least the following error conditions:

Error condition 1: the PDSCH scheduled by the PDCCH transmitted by the base station to the UE is inconsistent with the PDSCH actually received by the UE.

If there are HARQ-ACKs of multiple PDSCH to be transmitted together, i.e., corresponding to a same HARQ-ACK codebook, and if the DL assignment indicator (DAI) is contained in the PDCCH for scheduling these PDSCHs, such as T-DAI (the total DAIs, which represents the total number of all the PDSCHs from the first PDSCH to the current PDCCH monitoring occasion) and the C-DAI (counted of the DAI, which represents the total number of the PDSCHs from the first PDSCH to the current PDCCH monitoring occasion and the PDSCHs of the current carrier), then when all the PDCCHs in last one PDCCH monitoring occasion are not detected by the UE, the UE cannot learn the missed detection of these PDCCHs/PDSCHs, so that the size of the HARQ-ACK codebook generated by the UE is different from the size expected to be received by the base station, which is recorded as an error condition 1.1. If such an error occurs in the $CB_a$ when the base station triggers the UE to retransmit the $CB_a$ and transmits the $CB_b$ together, it may cause an error of the new codebook $CB_n$.

In another extreme condition, the UE does not detect any PDCCH/PDSCH that needs to be transmitted in the same HARQ-ACK codebook, and the UE also cannot learn the missed detection of these PDCCH/PDSCHs. Therefore, when the base station triggers the UE to retransmit the HARQ-ACKs of the PDSCHs, the UE may report the HARQ-ACKs of the PDSCHs which were detected last time, instead of reporting the HARQ-ACKs of the PDSCHs expected by the base station, which is recorded as an error condition 1.2. If such an error occurs in the $CB_a$, when the base station triggers the UE to retransmit the $CB_a$ together with the $CB_b$, it may cause an error of the new codebook $CB_n$.

Error condition 2: The UCI transmitted by the UE to the base station is inconsistent with the UCI actually received by the base station.

For example, since the base station is interfered by other interference sources when receiving the HARQ-ACK, the base station fails to detect the HARQ-ACK. In some cases, the base station may not be able to determine whether the undetected HARQ-ACK was not transmitted by the UE, or was transmitted by the UE but not received by the base station. For example, on some unlicensed frequency bands, the UE needs to perform clear channel assessment (CCA) before transmitting the HARQ-ACK. When the CCA result is idle, the UE can transmit HARQ-ACK, that is, the UE needs to perform listen before talk (LBT) before transmitting the HARQ-ACK. Therefore, the UE does not transmit the HARQ-ACK, either because the LBT fails or because the UE does not receive the PDSCH scheduled by PDCCH. On the unlicensed frequency band, the UE might have transmitted the HARQ-ACK but the base station has not received it due to the presence of the hidden terminal. It is not difficult to see that the base station may not be able to distinguish the above conditions. If such an error occurs in the $CB_a$, it may cause an error of the new codebook $CB_n$, when the base station triggers the UE to retransmit the $CB_a$ together with the $CB_b$.

If more than one HARQ-ACK codebooks need to be transmitted together, for example, when the base station triggers the UE to retransmit $CB_a$ and $CB_b$ together with the $CB_c$, the above described errors will become more serious and frequent. For the sake of simplicity of description, unless otherwise specified, the analysis is performed by taking transmission of at most two HARQ-ACK codebooks once as an example, but the method of this embodiment is also applicable to the transmission of more than two codebooks.

Figure 7:
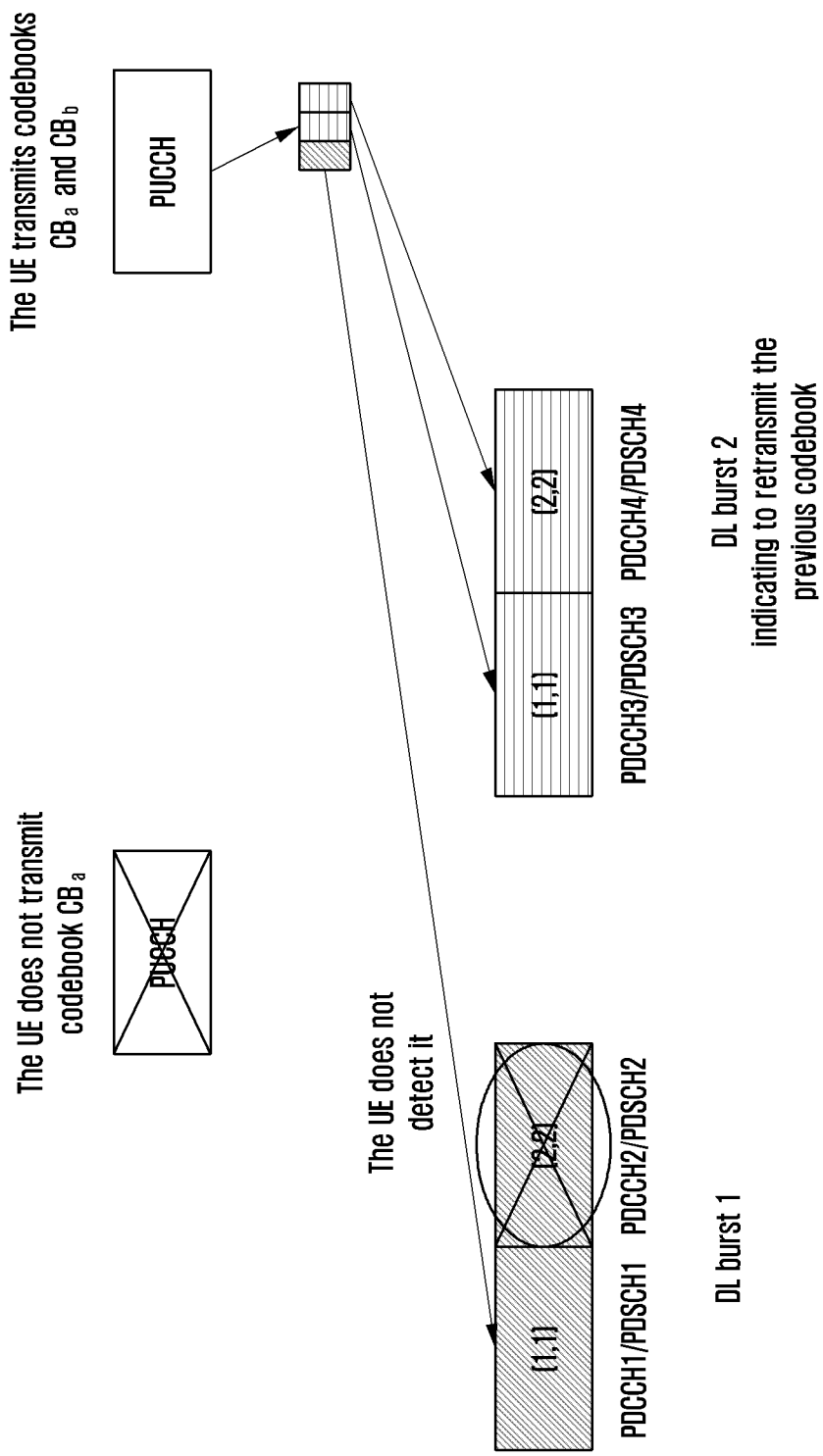
FIG. 7 is a schematic diagram of determining one or more HARQ-ACK codebooks according to an embodiment of the disclosure.

As shown in FIG. 7, the HARQ-ACK codebook is a dynamic codebook, the base station transmits two PDCCHs to schedule the PDSCHs in the downlink transmission burst 1, and (C-DAI, T-DAI) are (1,1) and (2,2) respectively. The UE misses the second PDCCH (2,2), the UE is unaware of this missed detection, and the $CB_a$ only contains 1 bit of HARQ-ACK corresponding to the first PDCCH/PDSCH. The error condition 1.1 occurs. The UE does not transmit $CB_a$ due to the LBT's failure, when the UE expects to transmit the $CB_a$. Although, the base station transmits two PDCCHs in the downlink transmission burst 2 to schedules other two PDSCHs, (C-DAI, T-DAI) are (1,1) and (2,2), respectively, and the codebook of HARQ-ACK of the two PDSCHs is $CB_b$. The base station also triggers retransmission of the previous HARQ-ACK codebook in the two PDCCHs. The UE receives the two PDCCHs and generates 2 bits of HARQ-ACK. The UE determines that the previous HARQ-ACK codebook is $CB_a$, and the UE cascades $CB_a$ and $CB_b$ to generate a new codebook CB as 3 bits of HARQ-ACK, wherein the first bit is from $CB_a$, which corresponds to PDSCH1, and the last 2 bits are from $CB_b$, which corresponds to PDSCH3/4. It is not difficult to see that the base station expects to receive 4 HARQ-ACKs, but the UE transmits 3 bits. The base station cannot determine that the received 3 bits correspond to which PDSCH.

Figure 8:
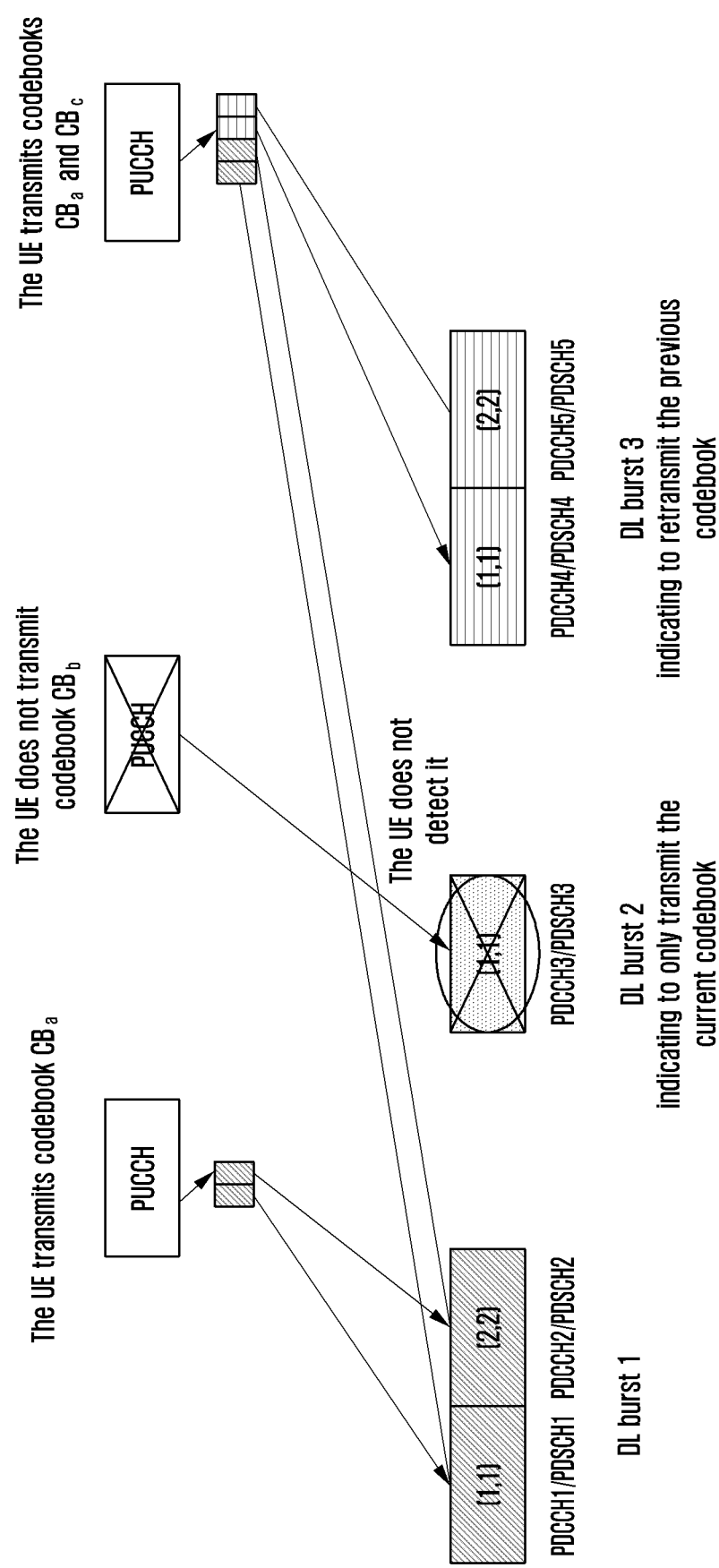
FIG. 8 is a schematic diagram of determining one or more HARQ-ACK codebooks according to various embodiment of the disclosure.

As shown in FIG. 8, the HARQ-ACK codebook is a dynamic codebook, the base station transmits two PDCCHs to schedule the PDSCHs in the downlink transmission burst 1, and (C-DAI, T-DAI) are (1,1) and (2,2) respectively. The UE detects the two PDCCHs and generates a $CB_a$ which contains 2 bits of HARQ-ACK. The UE successfully transmits the $CB_a$ in the uplink slot in which the $CB_a$ is expected to be transmitted, and the base station detects the $CB_a$. The base station transmits one PDCCH in the downlink transmission burst 2 to schedule one PDSCH, (C-DAI, T-DAI) are (1,1) respectively, and the codebook of the HARQ-ACK of this PDSCH is $CB_b$. The base station does not trigger the retransmission of $CB_a$ in this PDCCH because the base station correctly receives the $CB_a$. However, the UE misses this PDCCH/PDSCH, that is, the error condition 1.2 occurs.

Correspondingly, the UE also does not transmit the $CB_b$, and the base station does not detect the $CB_b$, that is, the error condition 2 occurs. The base station transmits two PDCCHs in the downlink transmission burst 3 to schedule the PDSCHs, (C-DAI, T-DAI) are (1,1) and (2,2) respectively, corresponding to the codebook $CB_c$, and the base station triggers the retransmission of the previous HARQ-ACK codebook. The HARQ-ACK codebook that the base station expects to trigger is $CB_b$, but since the UE does not receive the PDSCH3, the HARQ-ACK codebook that the base station triggers is mistaken as the $CB_a$. Although the UE learns that it has already transmitted the $CB_a$, the UE cannot determine whether the base station receives the $CB_a$, thus the UE considers that, it is because the base station does not receive the $CB_a$ that the base station triggers the retransmission of $CB_a$. The UE cascades the $CB_a$ and $CB_c$ to generate a new codebook $CB_n$ as 4 bits of HARQ-ACK, wherein the first and second bits are from the $CB_a$, corresponding to PDSCH1/2, and the last two bits are from $CB_c$, corresponding to PDSCH4/5. It is not difficult to see that the codebook $CB_n$ that the base station expects to receive is a cascade of $CB_b$ and $CB_c$, and a total of three HARQ-ACKs corresponding to PDSCH3/4/5, respectively, but the UE transmits the cascade of $CB_a$ and $CB_c$.

Figure 9A:
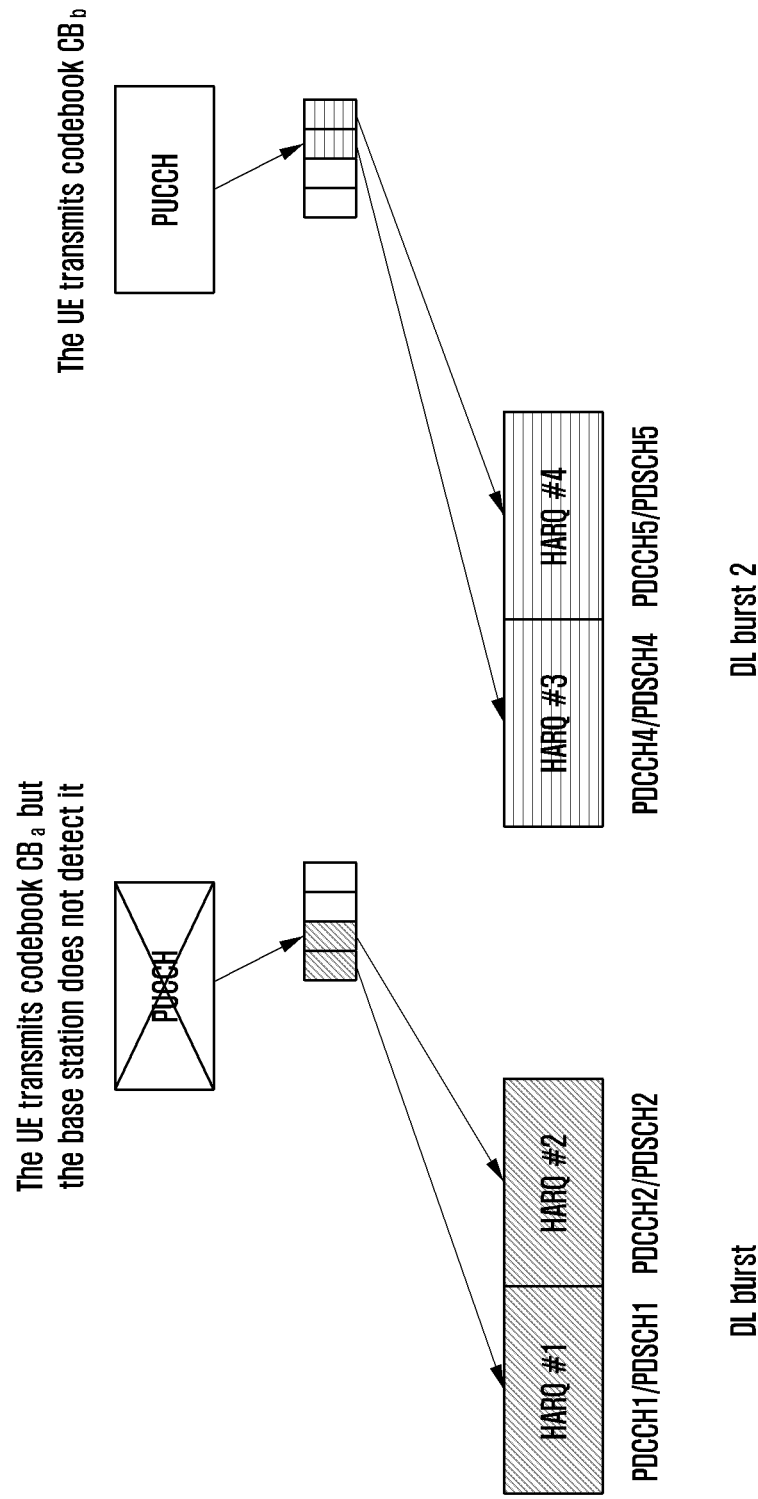
FIG. 9a is a schematic diagram of determining one or more HARQ-ACK codebooks according to various embodiment of the disclosure.

An example of two semi-static HARQ-ACK codebooks is shown in FIGS. 9a and 9b. The HARQ-ACK codebook transmitted at each time contains the HARQ-ACKs of all the HARQ processes. Assuming that a total of 4 HARQ processes are numbered as #1~#4, if the base station does not schedule this HARQ process when the HARQ-ACK is fed back, the NACK occupation is fed back. In addition, there are two methods for determining the value of the HARQ-ACK of the HARQ process that has already fed back the HARQ-ACK: FIG. 9a for the same PDSCH of the same HARQ process, if the UE has already fed back the HARQ-ACK, the UE will set the HARQ-ACK of this HARQ process as a predefined value, i.e., NACK; FIG. 9b for the same PDSCH of the same HARQ process, if the UE has already fed back the HARQ-ACK, the next HARQ-ACK fed back by the UE is the same as the previous one. The following two cases are analyzed.

As shown in FIG. 9a, the base station transmits two PDCCHs in the downlink transmission burst 1 to schedule the PDSCHs, which are HARQ processes #1, #2, respectively, and UE receives both of them. The UE transmits a codebook $CB_a$ which contains HARQ-ACKs of 4 HARQ processes, wherein the first 2 bits correspond to the decoding result of the PDSCHs of the HARQ processes #1, #2, and the last 2 bits are NACK. Assuming that the base station has not received the $CB_a$, the error condition 2 occurs. The base station schedules HARQ processes #3, #4 in the downlink burst 2, and the UE receives both of them. The UE generates a codebook $CB_b$ which contains HARQ-ACKs of 4 HARQ processes. According to method FIG. 9a, since the UE has already transmitted HAQR-ACKs of HARQ processes #1, #2, the HARQ-ACKs of the two processes are the predefined value of NACK, and the UE generates the last two bits of HARQ-ACK of the codebook according to the decoding result of the processes #3, #4. It is not difficult to see that due to the error condition 2, the base station is always unable to obtain the HARQ-ACKs of the HARQ processes #1, #2.

As shown in FIG. 9b, the base station transmits two PDCCHs in the downlink transmission burst 1 to schedule the PDSCHs, which are HARQ processes #1, #2 respectively, and UE receives both of them. The UE transmits a codebook $CB_a$ which contains HARQ-ACKs of 4 HARQ processes, where the first 2 bits correspond to the decoding result of the PDSCHs of the HARQ processes #1, #2, and the last 2 bits are NACK. The base station correctly receives the $CB_a$. The base station schedules HARQ process #1 in downlink burst 2, corresponding to a new packet, which is carried by PDSCH3. The UE missed this PDSCH, the error condition 1.2 occurs, and the UE does not feed back the codebook $CB_b$. The base station schedules the HARQ processes #3, #4 in the downlink burst 3, and both are received by the UE. The UE generates a codebook $CB_c$ which contains the HARQ-ACKs of 4 HARQ processes. According to method FIG. 9b, although the UE has already transmitted the HARQ-ACKs of HARQ processes #1, #2, but does not receive the new scheduling of the two HARQ processes yet. Therefore, the UE feeds back the value of the HARQ-ACK which has already been fed back before. It is not difficult to see that due to the error condition 1.2, the HARQ-ACK of the HARQ process #1 obtained by the base station is that of PDSCH1 instead of that of PDSCH3, causing that the base station cannot find that the UE does not receive the PDSCH3.

In order to solve the above error conditions, the base station may indicate which codebook or cascade of which codebooks that the UE needs to transmit. If it is a dynamic codebook, the base station may also indicate the size of the retransmitted codebook. These pieces of information are collectively referred to as HARQ-ACK codebook information.

In order to indicate which codebook or cascade of which codebooks that the UE needs to transmit, the base station may allow the PDCCH for scheduling the PDSCH contain a bit field, which is used to indicate which codebook the PDSCH belongs to. As described in embodiment 2, X bit of information may be added in the DCI to indicate $2^X$ HARQ-ACK codebooks, for example, adding of 1 bit of information to distinguish two HARQ-ACK codebooks, and the PDSCHs scheduled by all PDCCHs with the same 1 bit of information feed back the HARQ-ACK in the same HARQ-ACK codebook. For 1 bit of information, a fixed value or 0/1 may be used to distinguish the codebook number, or the codebook index may be distinguished by the toggle/non-toggle method.

The HARQ-ACK timing K1 indicated in the PDCCH for scheduling the PDSCH may be accurate slot information, or may indicate that the HARQ-ACK timing needs to be determined by combining another PDCCH. If the HARQ-ACK timing K1 is accurate slot information, the PDCCHs associated with the same uplink slot which are determined by K1 may indicate the same HARQ-ACK codebook number. If multiple PUCCHs may be transmitted in one slot, the PDCCHs associated with the same PUCCH set may indicate the same HARQ-ACK codebook index according to the method of Embodiment 2. If the HARQ-ACK timing indicates that the HARQ-ACK timing needs to be determined by combining another PDCCH, for example, the value of the HARQ-ACK timing K1 in the PDCCH-X for scheduling PDSCH-X is a specific value, and then there is another PDCCH-Y to trigger the HARQ-ACK transmission of the PDSCH-X, if this PDCCH-Y also schedules one PDSCH-Y, and the base station expects to transmit the HARQ-ACKs of the PDSCH-X and the PDSCH-Y together, HARQ-ACK codebook numbers in the PDCCH-X and the PDCCH-Y are same. Or, if the PDSCH-X belongs to the PDSCH set corresponding to a certain PUCCH, and if the time difference from the PDSCH-X to this PUCCH is less than the minimum HARQ-ACK processing delay, the valid HARQ-ACK value of the PDSCH-X is reported in this PUCCH; if the time difference from the PDSCH-X to this PUCCH is less than the minimum HARQ-ACK processing delay, the NACK value of the PDSCH-X is reported in this PUCCH. If the PDSCH-X does not belong to the PDSCH set corresponding to a certain PUCCH, the HARQ-ACK is not reported. For example, the semistatic codebook is determined by the HARQ-ACK timing K1={0,1,2,3,4,5,6,7} and/or the time offset K_offset=4. It is assumed that the PDSCH-X is in the slot n-10, if the base station indicates that the UE transmits the PUCCH in the slot n, and indicates that the codebook is determined based on the K1 and K_offset, then the PDSCH set corresponding to the PUCCH is the PDSCHs in slot n to slot n-11. The UE reports the HARQ-ACKs of the PDSCHs in the 12 slots in the PUCCH, which contains the HARQ-ACKs of the PDSCH-X in slot n-10. If the UE only receives the PDSCH-X in the PDSCH set corresponding to a certain PUCCH, then the UE does not feed back the HARQ-ACKs.

Figure 10A:
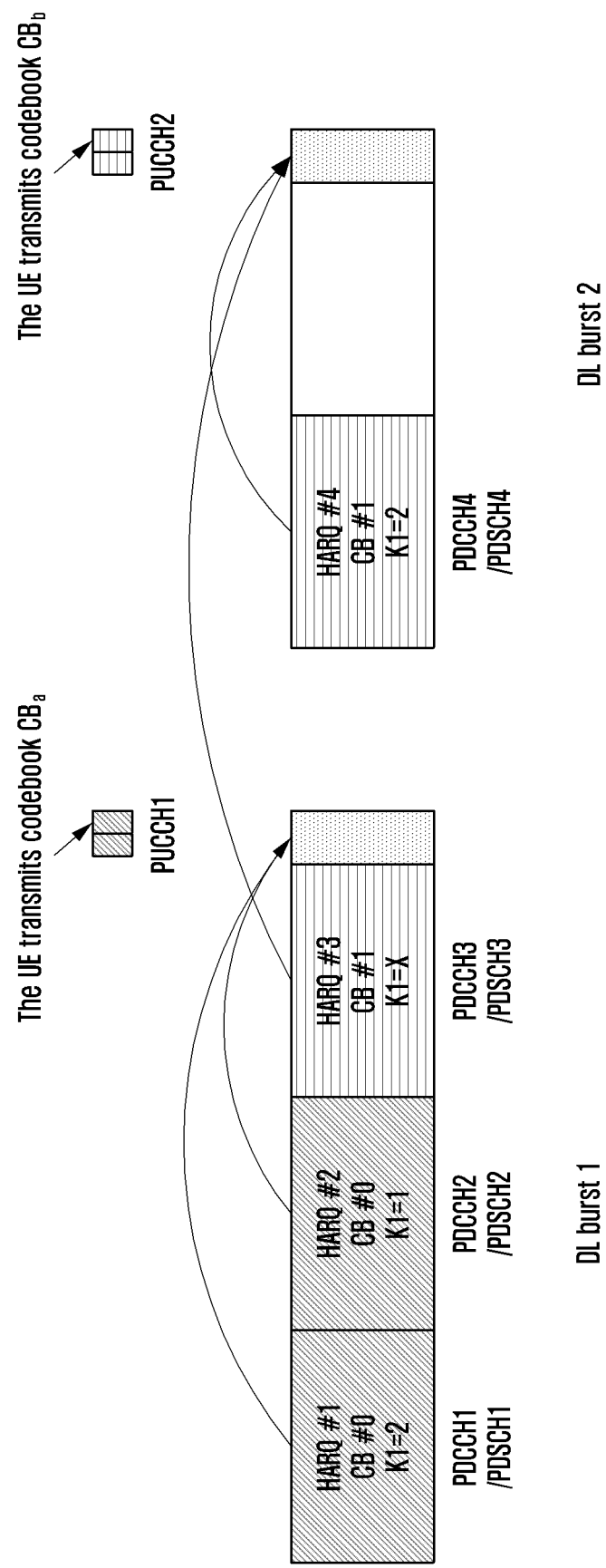
FIG. 10a is a schematic diagram of determining one or more HARQ-ACK codebooks according to various embodiment of the disclosure.

As shown in FIG. 10a, the base station indicates that K1 is 2 and 1 respectively in PDCCH1/PDCCH2 in the downlink burst 1, whose codebook index is #0, and the HARQ-ACKs of the two PDSCHs are transmitted in the same HARQ-ACK codebook $CB_a$. K1 is indicated as a special value X in the PDCCH3 in the downlink burst 1. For example, the standard may predefine that "111" indicates requiring of another PDCCH to determine the HARQ-ACK timing, and the codebook index #1 is indicated in PDCCH3 for indicating that feeds back is needed to be performed in another HARQ-ACK codebook $CB_b$. K1 is indicated as 2 in PDCCH4 in the downlink burst 2, whose codebook index is #1. Then, the UE may assume that the HARQ-ACK of the PDSCH3 and the HARQ-ACK of the PDSCH4 belong to the same codebook $CB_b$, and the uplink slot for transmitting the codebook is determined according to K1 in the PDCCH4.

When performing scheduling, the base station sequentially indicates the HARQ-ACK codebook index in chronological order, for example, indicating 0, 1, 0, 1 in turn. Then, when the UE continuously detects two same codebook numbers, or when the UE detects discontinuous codebook numbers (for the case where the X bits are greater than 1), the UE can determine that the corresponding PDCCH/PDSCH is missed. As shown in FIG. 9b, the codebook index in PDCCH1/2 should be #0, the codebook index in PDCCH3 should be #1, and the codebook index in PDCCH4/5 should be #0. The codebook numbers in the PDCCH 1/2/4/5 received by the UE are all #0, but the PUCCH to which the HARQ-ACK feedback time K1 indicated in the PDCCH pointed are PUCCHs of two different slots or two different time units, therefore, the UE may determine that at least one PDCCH is missed between PDCCH 1/2 and PDCCH 4/5. It is generally considered that when determining the bit number X, it is assumed that the UE does not continuously miss the downlink transmission corresponding to the $2^X$ HARQ-ACK codebooks. Therefore, if the codebook numbers received by the UE are continuous, the UE may consider that the PDSCH corresponding to one codebook is not missed. The determination of the bit number Y of the DAI follows the same principle, which considers that the UE does not continuously miss $2^Y$ PDSCHs.

For a semi-static codebook, such as HARQ-ACK feedback based on all HARQ processes, the size of the codebook is fixed, and the HARQ process corresponding to each bit in the codebook is fixed. The codebook index is mainly used to determine that valid HARQ-ACKs of which PDSCHs are transmitted in the same PUCCH or PUSCH. A valid HARQ-ACK is a HARQ-ACK bit generated according to a decoding result of a PDSCH, and the other HARQ-ACK bits are placeholder bits. In addition, if the codebook index is combined with other bit indications, the valid HARQ-ACKs of the PDSCH with different codebook numbers may also be transmitted together. For example, the HARQ-ACK timing K1 of the PDCCH with different codebook numbers may be set to point to a same PUCCH or PUSCH. In a semi-static codebook, although the size of the codebook is fixed, the value of the HARQ-ACK of each HARQ process in the codebook may be confused due to the above error conditions. In order to avoid the value confusion problem, it may be specified that for the same PDSCH of the same HARQ process, if the UE has already fed back the HARQ-ACK, and the UE does not find an abnormal codebook index indication (i.e., indication of discontinuous or next to duplicate codebook numbers), the UE may feed back the HARQ-ACK again according to the decoding result of the PDSCH, or, the UE sets the HARQ-ACK of this HARQ process to a predefined value NACK. If the UE has not previously transmitted this HARQ-ACK, the UE may feed back the HARQ-ACK again according to the decoding result of this PDSCH.

Figure 10B:
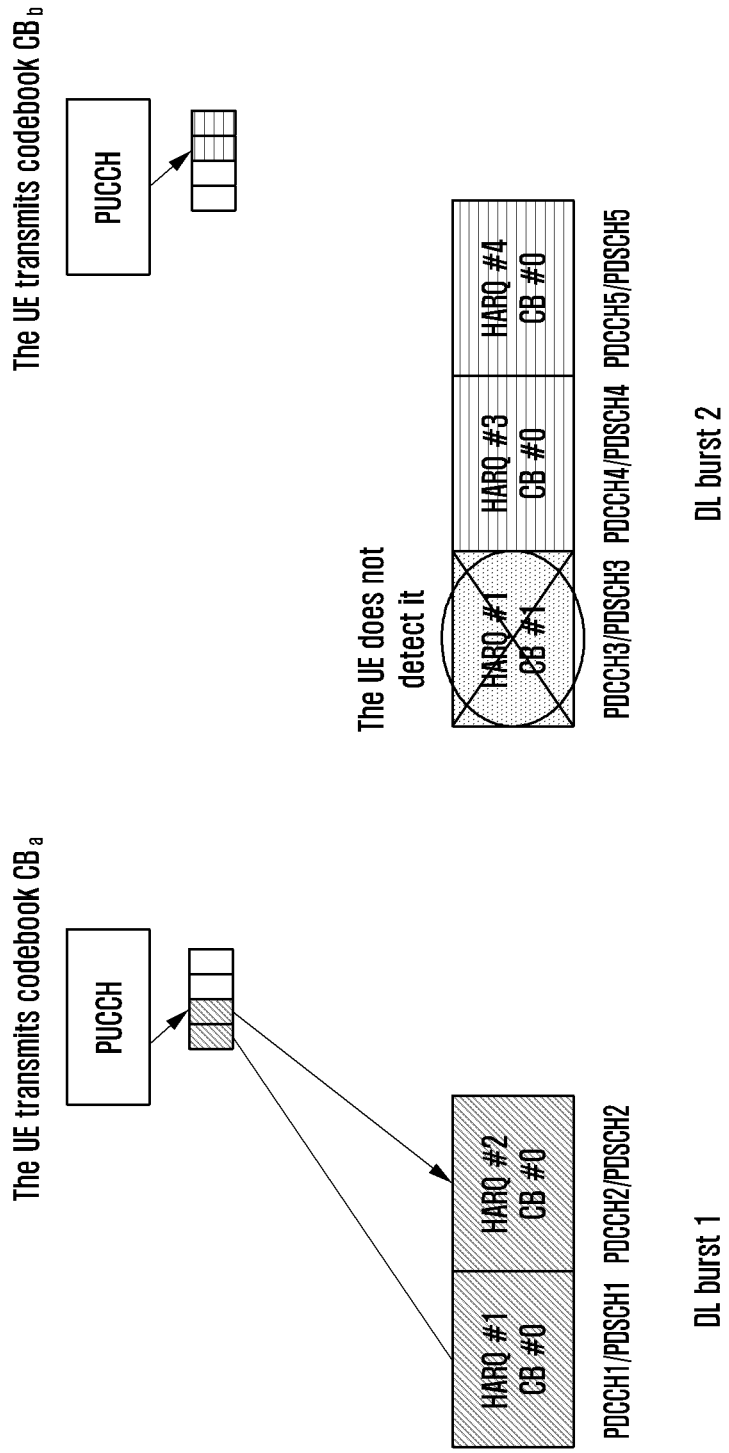
FIG. 10b is a schematic diagram of determining one or more HARQ-ACK codebooks according to various embodiment of the disclosure.

As shown in FIG. 10b, the base station indicates the codebook index #0 in the downlink burst 1, and indicates the codebook index #1 in the PDCCH 3 in the downlink burst 2, and indicates the codebook #0 in the PDCCH 4/5 in the downlink burst 2, however, the HARQ-ACK timing K1 of PDCCH 3/4/5 point to the same uplink slot, for example, K1 is equal to 3, 2, 1, respectively. Therefore, although the codebook numbers indicated by the PDCCH are different, but they indicate a same PUCCH. The codebook index continuously received by the UE is #0, thus the UE determines that one or more PDSCHs corresponding to one codebook are missed. Since the UE cannot determine which HARQ process corresponds to the missed PDSCH, the UE can only feed back the HARQ process that has ever fed the HARQ-ACK, as the NACK, in other words, the HARQ processes #1, 2 are NACK, and for the HARQ processes #3, 4, because they have not been fed back, so they may be fed back according to the decoding results.

As shown in FIG. 10c, the base station indicates the codebook index #0 in the downlink burst 1, and indicates the codebook code #1 in the downlink burst 2. If the codebook numbers received by the UE are continuous #0 and #1, the UE may separately feed back the HARQ-ACK according to the decoding result of the PDSCH 1/2/3/4 when transmitting the codebook $CB_b$ without setting the HARQ-ACK of PDSCH1/2 to NACK.

Figure 10D:
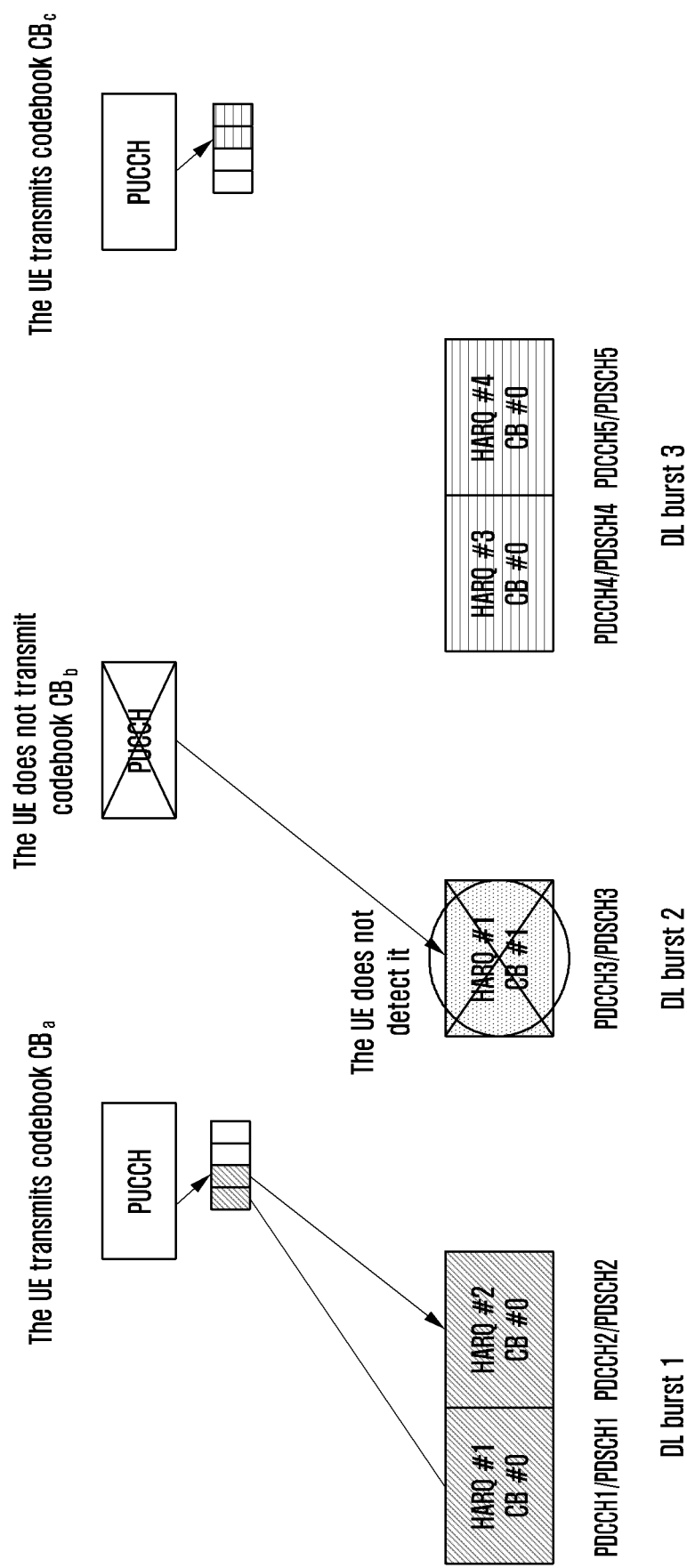
FIG. 10d is a schematic diagram of determining one or more HARQ-ACK codebooks according to various embodiment of the disclosure.

As shown in FIG. 10d, the base station indicates the codebook index #0 in the downlink burst 1, indicates the codebook code #1 in the downlink burst 2, and indicates the codebook code #0 in the downlink burst 3. The codebook index continuously received by the UE is #0, thus the UE determines that one or more PDSCHs corresponding to one codebook are missed. Since the UE cannot determine which HARQ process corresponding to the missed PDSCH, the UE can only feed back the HARQ process that has fed back the HARQ-ACK as the NACK, in other words, the HARQ processes #1, 2 are NACK, and for the HARQ processes #3, #4, because they have not been fed back, so they may be fed back according to the decoding result.

Figure 10E:
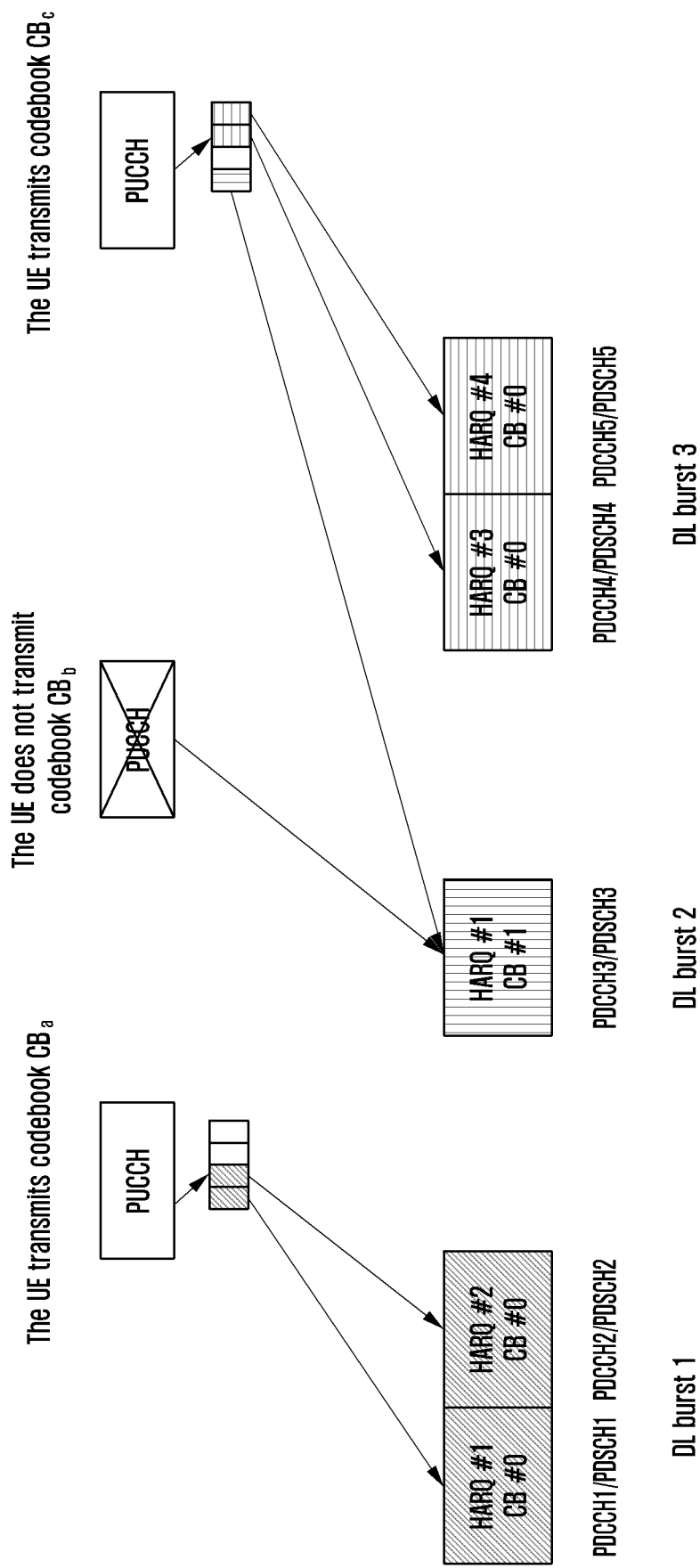
FIG. 10e is a schematic diagram of determining one or more HARQ-ACK codebooks according to various embodiment of the disclosure.

As shown in FIG. 10e, the base station indicates the codebook index #0 in the downlink burst 1, indicates the codebook code #1 in the downlink burst 2, and indicates the codebook code #0 in the downlink burst 3. The codebook index continuously received by the UE is #0, #1, #0, thus the UE determines that no codebook has been missed. The UE failed to transmit $CB_b$ due to the LBT's failure, when transmitting the codebook $CB_b$. Therefore, the UE generates the HARQ-ACK according to the decoding result of the PDSCH3/4/5, and the HARQ-ACK of the HARQ process #2 is reported according to the decoding result of the PDSCH2.

Another method for avoiding the value confusion of the semi-static codebook HARQ-ACK is to define a timer whose starting point is an uplink slot or uplink time unit in which the UE successfully transmits the HARQ-ACK in uplink slots or uplink time units determined according to the HARQ-ACK timing in the PDCCH. For the same PDSCH of the same HARQ process, if the UE has already fed back the HARQ-ACK, the UE may feed back the HARQ-ACK again according to the decoding result of the PDSCH in case that the timer has not timed out. Or, the UE will set the HARQ-ACK of the HARQ process to a predefined value NACK. If the UE has not previously transmitted this HARQ-ACK, the UE may feed back the HARQ-ACK again according to the decoding result of this PDSCH. This timer may be considered to count separately for each HARQ process. The value of this timer may be pre-defined by standard or configured by the base station. A special case is that, when the value of this timer is 0, it means that if the UE has already fed back the HARQ-ACK, the UE sets the HARQ-ACK of the HARQ process to a predefined value NACK.

Figure 10F:
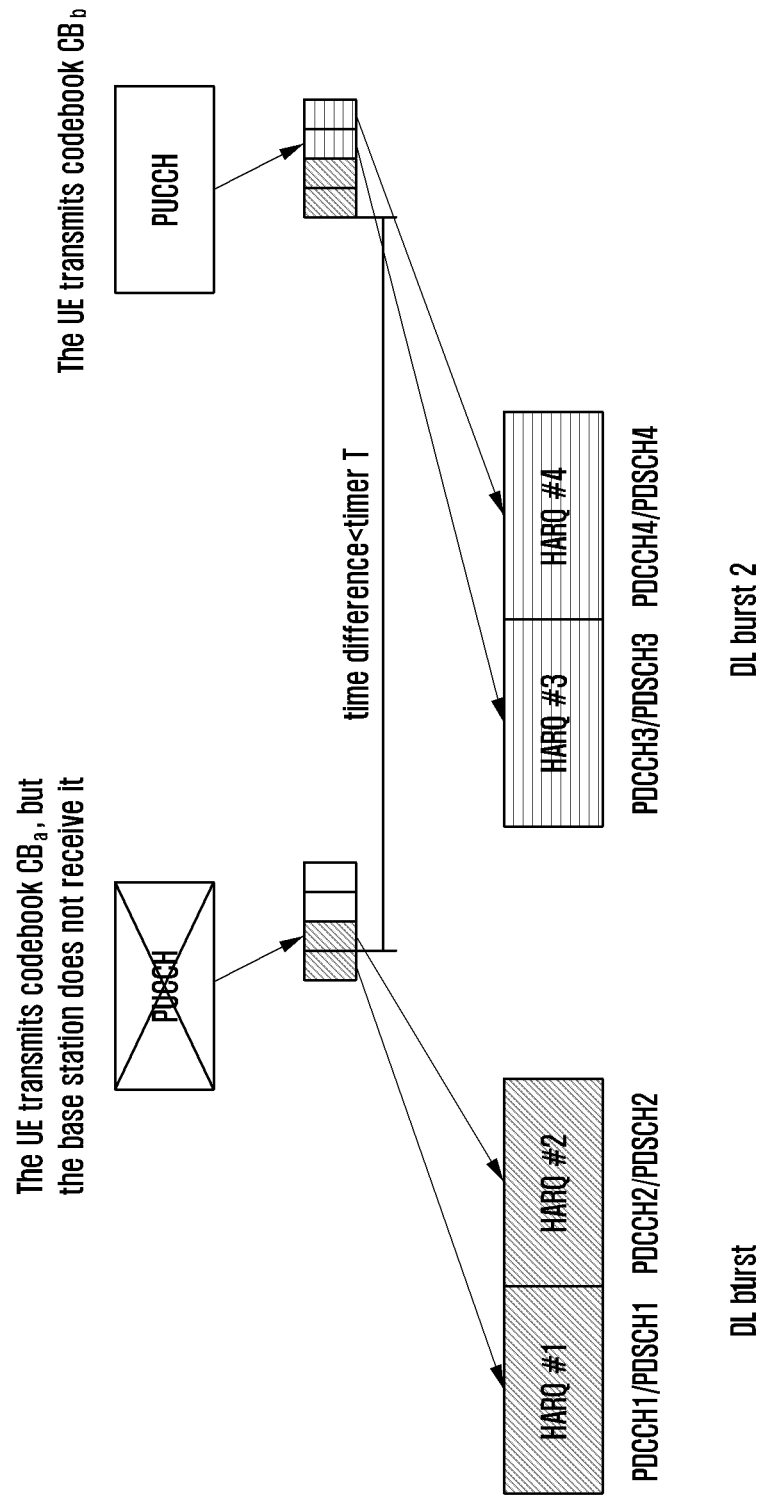
FIG. 10f is a schematic diagram of determining one or more HARQ-ACK codebooks according to various embodiment of the disclosure.

As shown in FIG. 10f, it is assumed that the UE receives the PDSCH 1/2 in the downlink transmission burst 1, and transmits the codebook $CB_a$, the first 2 bits are the HARQ-ACK of the PDSCH 1/2, and the last 2 bits are the NACK. However, the base station does not detect $CB_a$. The UE receives the PDCCH 3/4, and determines the time position in which the codebook $CB_b$ is transmitted according to the HARQ-ACK timing K1 indicated in the PDCCH 3/4. Since for the HARQ processes #1 and #2, the time difference between the uplink slot in which the codebook $CB_b$ is transmitted and the uplink slot in which the codebook $CB_a$ is transmitted is less than the timer length T, and the UE may feed back the HARQ-ACK according to the decoding result of the PDSCH1/2/3/4.

Based on the codebook index indication, for the dynamic codebook, it may be specified that if the UE does not find an abnormal codebook index indication (i.e., indication of discontinuous or next to duplicate codebook numbers), and the UE is triggered to retransmit the HARQ-ACK of the previous codebook, then the UE may again feed back the HARQ-ACK according to the decoding result of the PDSCH corresponding to the codebook. Or, the UE sets the HARQ-ACK of the PDSCH as NACK.

In order to ensure that the error of the size of the previous codebook (e.g., error condition 1.1) in the dynamic codebook will not cause the error of the new codebook, if the base station triggers the retransmission of the previous codebook, it is necessary to consider the size of the previous codebook when T-DAI and/or C-DAI counts in the PDCCH of the PDSCH corresponding to the current codebook. For example, if both the T-DAI and the C-DAI consider the size of the previous codebook, assuming that the size of the previous codebook is 3, the (C-DAI, T-DAI) in the PDCCH corresponding to the first HARQ-ACK of the current codebook should be (4, 4), or (4, M). If there are other PDCCHs in the same PDCCH monitoring area, M indicates the sum of the size of the previous codebook and the PDCCHs in this PDCCH monitoring area. Or, C-DAI counts only in one codebook, and T-DAI needs to count the size of the previous codebook. Or, T-DAI counts only in one codebook, and C-DAI needs to count the size of the previous codebook.

In addition, in order to reduce the impact of the error of the size of the previous codebook (e.g., error condition 1.1) on the new codebook, the prediction may be performed when the T-DAI is set, that is, the T-DAI may indicate the total number of bits of the PDSCHs or HARQ-ACKs that are expected to be transmitted in the same HARQ-ACK codebook, instead of being limited to the total number of bits of the HARQ-ACKs in the current slot.

In addition, in order to reduce the impact of the error of the size of the previous codebook (e.g., error condition 1.1) on the new codebook, T-DAI and C-DAI may only count in the current codebook and use the additional bit field to indicate the T-DAI of the previous codebook, when triggering the transmission of the current codebook together with the previous codebook.

Figure 11A:
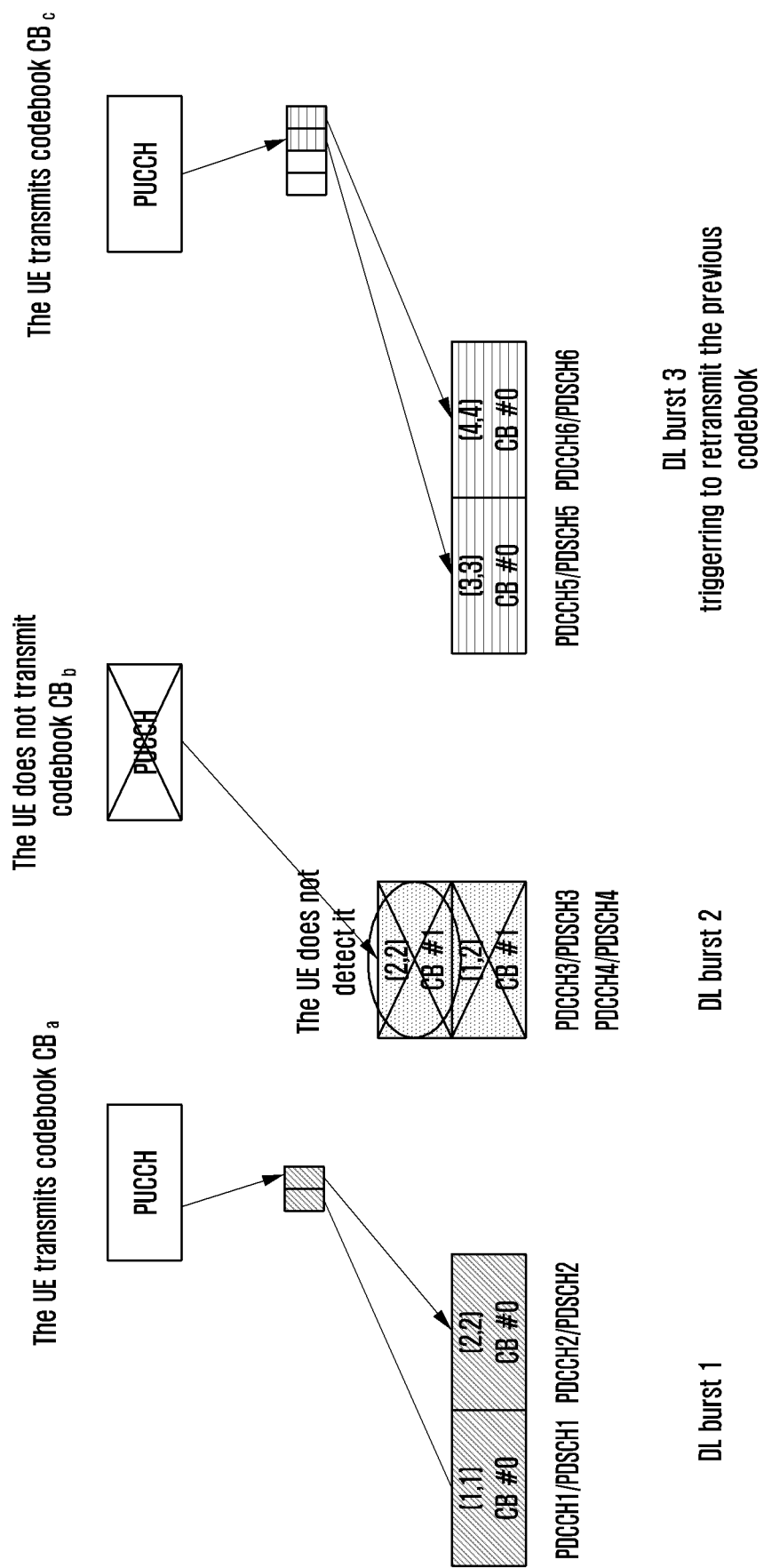
FIG. 11a is a schematic diagram of determining one or more HARQ-ACK codebooks according to various embodiment of the disclosure.

As shown in FIG. 11a, it is assumed that if the base station triggers the HARQ-ACK retransmission of the previous codebook, the base station will allow the (C-DAI, T-DAI) in the PDCCH to jointly count the PDSCHs of the current codebook and the previous codebook. Therefore, (3, 3) and (4, 4) are respectively indicated in the PDCCHs 5 and 6 in the downlink burst 3, indicating that the previous codebook has 2 bits of HARQ-ACK. It is assumed that the PDCCH 3/4 is not detected by the UE, and therefore the codebook index #1 is not detected. When generating the codebook $CB_c$, the UE sets the HARQ-ACK corresponding to the previous codebook as NACK, and the last 2 bits of the $CB_c$ generates the HARQ-ACK according to the decoding result of the PDSCH5/6.

Figure 11B:
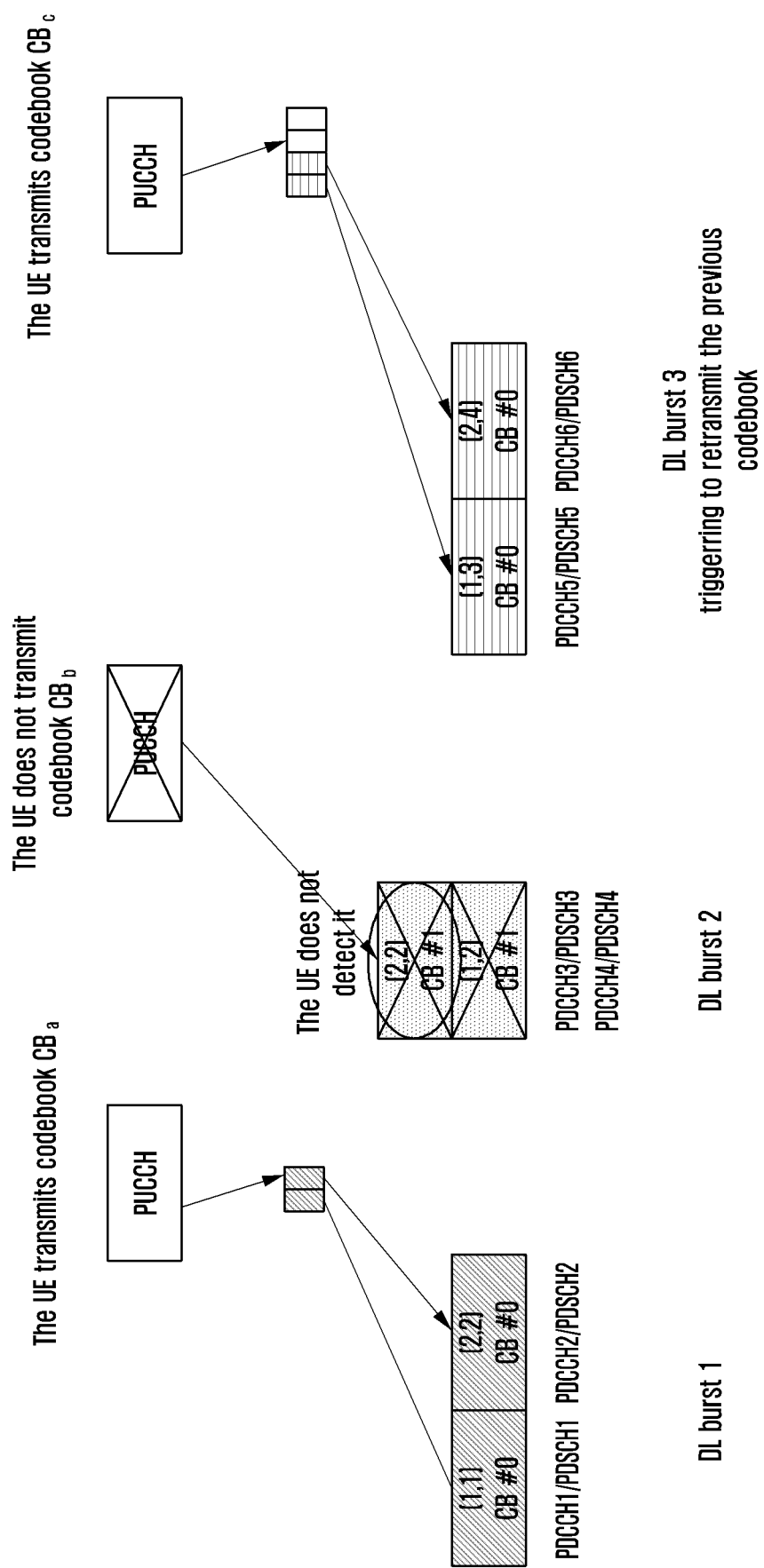
FIG. 11b is a schematic diagram of determining one or more HARQ-ACK codebooks according to various embodiment of the disclosure.

As shown in FIG. 11b, if the base station triggers the HARQ-ACK retransmission of the previous codebook, the base station will allow the T-DAI of the PDCCH to jointly count the PDSCHs of current codebook and the previous codebook, and the C-DAI only counts the PDSCHs of the current one codebook. It is assumed that the UE does not detect PDCCH 3/4, so the codebook index #1 is not detected, and the codebook $CB_b$ is not transmitted. When the base station schedules PDCCH 5/6, it triggers the retransmission of the previous codebook, and (C-DAI, T-DAI) in PDCCH 5/6 indicates (1,3), (2,4), respectively. When the UE generates the codebook $CB_c$, the first 2 bits of the $CB_c$ generate the HARQ-ACK according to the decoding result of the PDSCH 5/6, and the last 2 bits of the $CB_c$, are set as NACK, corresponding to the HARQ-ACK of the previous codebook.

Further, the PDCCH for scheduling the PDSCH, and/or the PDCCH for scheduling the PUSCH that may contain the HARQ-ACK feedback information, contains a bit field for indicating the set of HARQ-ACK codebooks fed back in the PUCCH or the PUSCH. This has the advantage of supporting retransmission of more than one HARQ-ACK codebook or supporting retransmission of non-continuous HARQ-ACK codebooks. If the number of bits of the bit field is 1 bit, only the retransmission of the current and immediate previous codebooks may be supported. If the number of bits Z>1, then the retransmission of the current and at most the immediate first $2^Z-1$ codebooks may be supported, for example, Z=2, then "00" indicates that only the current codebook is transmitted; "01" indicates that the current and previous codebooks are transmitted; "10" indicates the current and the first two codebooks are transmitted; "11" indicates the current and the first three codebooks are transmitted. Or, "00" represents that only the current codebook $CB_i$ is transmitted, "01" represents that the current $CB_i$ and the previous codebook $CB_{i-1}$ are transmitted, "10" represents that the current $CB_i$ and the previous codebook $CB_{i-2}$ are transmitted, "11" represents that the current $CB_i$ and the previous codebook $CB_{i-3}$ are transmitted. Or, a set of $2^Z$ codebooks may be configured by the higher layer signaling, and "00"~"11" correspond to these sets one by one, respectively. The latter is more suitable for the DCI for scheduling PUSCH, or for the DCI dedicated for triggering the HARQ-ACK transmission, since the UE cannot determine the current codebook is which codebook. The codebook set may be configured separately for DCI for scheduling PDSCH, the DCI of the PUSCH and/or dedicated DCI respectively, or a configuration of codebook set are applicable to all these DCI. If the codebook index is also included in the DCI for scheduling PUSCH or the DCI dedicated for triggering the HARQ-ACK transmission, the UE may also determine the current codebook. For example, if the indication bits of the codebook index and the set of codebooks that need to be fed back together are included in the DCI for scheduling PUSCH, and if the codebook index is indicated as "11" and the set of codebooks that need to be fed back together is indicated as "10", it indicates that the current $CB_3$ and $CB_1$ are trigged by the base station.

Figure 12A:
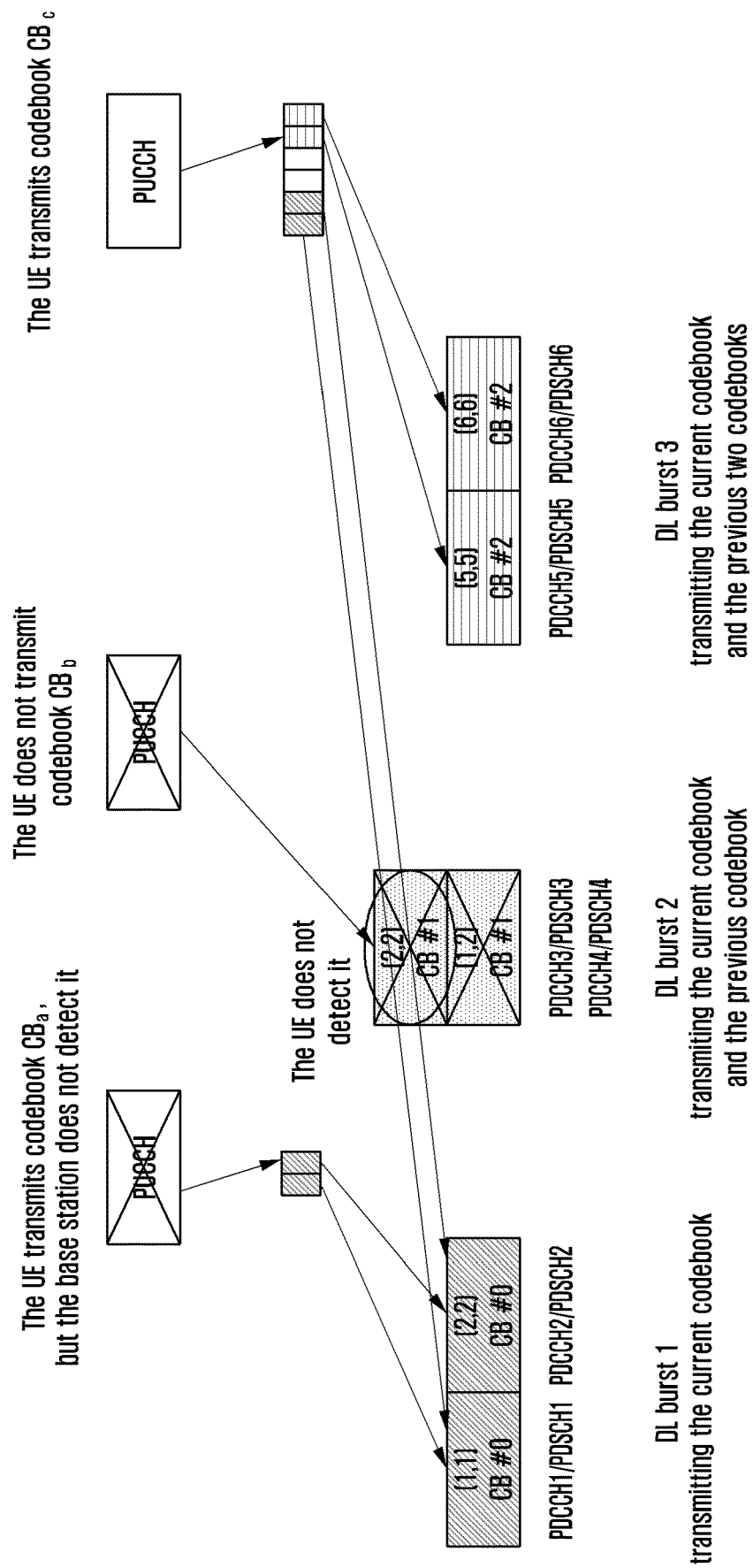
FIG. 12a is a schematic diagram of determining one or more HARQ-ACK codebooks according to various embodiment of the disclosure.

As shown in FIG. 12a, the codebook index is indicated as 2 bits, and the set of codebooks to be fed back together is indicated as 2 bits, which respectively represents to feed back the HARQ-ACK of current to current and the previous 3 codebooks. It is assumed that the UE does not detect PDCCH 3/4, the UE only detects the codebook index #0, #2, and does not detect the codebook index #1. The base station does not detect $CB_a$, thus it indicates that the current codebook is transmitted together with the previous codebook in the PDCCH3/4, but the UE misses the two PDCCHs and does not transmit $CB_b$. Then, the base station indicates in the PDCCH 5/6 that the UE transmits the current codebook and retransmits the previous two codebooks. When the UE generates the codebook $CB_c$, the UE sets the HARQ-ACK corresponding to the codebook #1 as NACK, and the HARQ-ACKs of the codebook #0 and codebook #2 generates the HARQ-ACK according to the decoding results of the PDSCH1/2/5/6.

Figure 13:
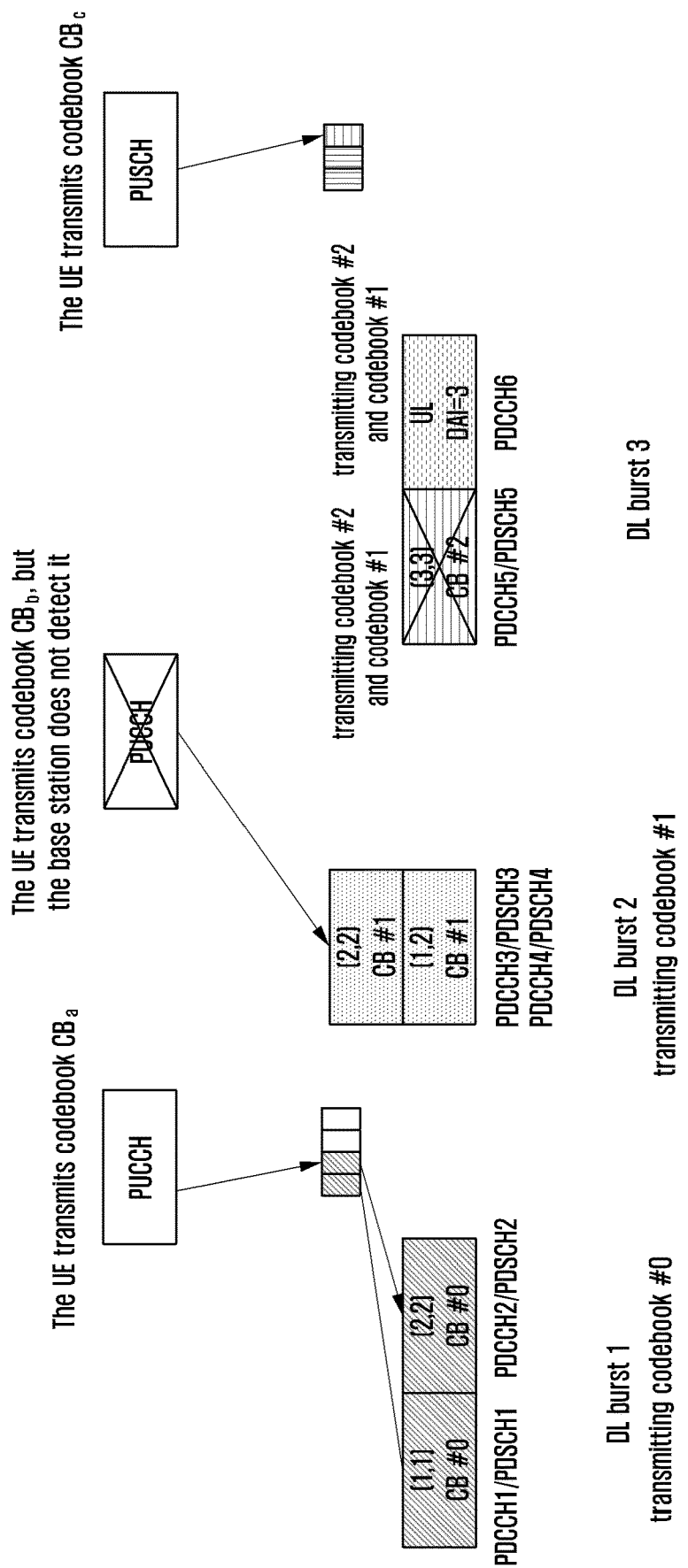
FIG. 13 is a schematic diagram of determining one or more HARQ-ACK codebooks according to various embodiment of the disclosure.

As shown in FIG. 13, the codebook index is indicated as 2 bits, and the set of codebooks to be fed back together is indicated as 2 bits. It is assumed that the UE does not detect PDCCH5, the base station does not detect the $CB_b$, thus it is indicated that the codebook #1 and the codebook #2 are transmitted together in PDCCH 5/6. PDCCH6 is the DCI for scheduling PUSCH, indicating that codebook #1 and codebook #2 are transmitted together, and the total size is 3. It is not difficult to see that if the PDCCH 6 indicates the current and previous codebooks, since the UE does not receive the current codebook #2 transmitted by the base station, the UE will consider the codebook #1 as the current codebook, thereby causing an error. If the codebook index that needs to feed back the HARQ-ACK is explicitly indicated in PDCCH 6, there is no errors. When generating the codebook $CB_c$, the UE sets the HARQ-ACK corresponding to the codebook #2 as NACK, and the HARQ-ACK of the codebook #1 generates HARQ-ACK according to the decoding result of the PDSCH 3/4.

In the PDCCH for scheduling the PUSCH, only the bit field indicating the size of the current codebook may be contained, or the total size of all codebooks that need to be transmitted together is contained, or the size of each codebook that needs to be transmitted together is contained.

When the set of HARQ-ACK codebooks that need to be transmitted together contains more than one codebooks, the current codebook or the codebook with the last reception time may be arranged at the beginning, and then the other codebooks that need to be retransmitted together are cascaded. Or, the current codebook or the codebook with the last reception time are arranged at the end, and the previous codebook is arranged in front of the current codebook. Or, the cascading is sequentially performed according to the chronological order of the signaling that triggers the transmission of the codebook. If the signaling for triggering the retransmission of another codebook is received between the PDCCHs corresponding to the same codebook, the retransmitted codebook is arranged between the HARQ-ACKs of the PDSCH of the codebook according to the sequence of receiving the signaling.

Figure 12B:
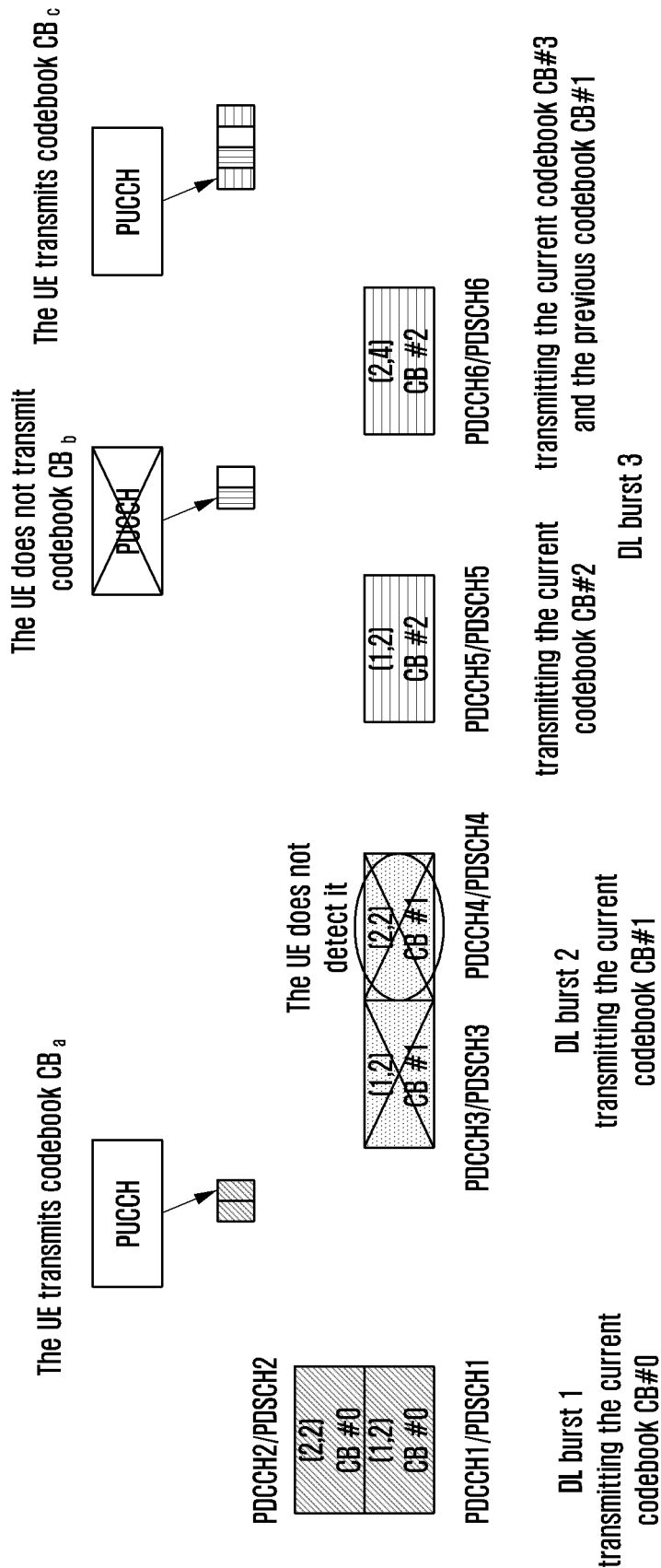
FIG. 12b is a schematic diagram of determining one or more HARQ-ACK codebooks according to various embodiment of the disclosure.
Figure 12C:
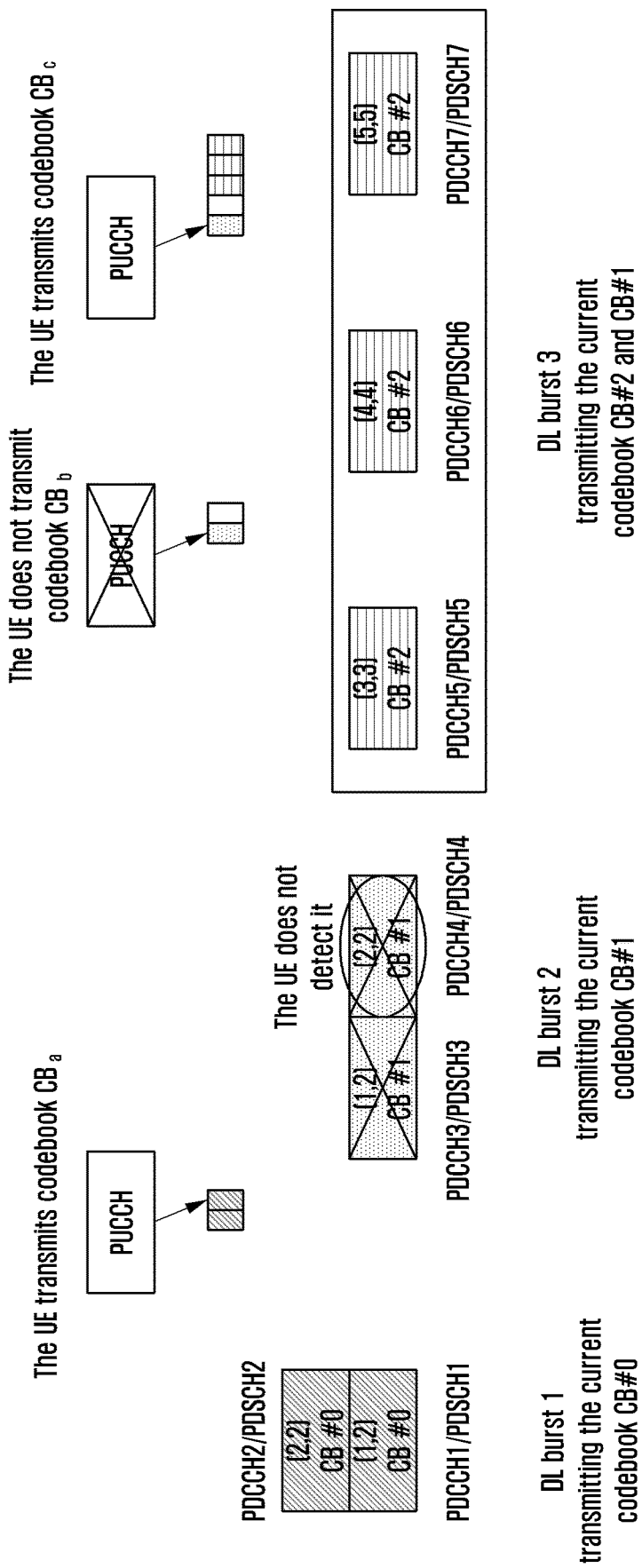
FIG. 12c is a schematic diagram of determining one or more HARQ-ACK codebooks according to various embodiment of the disclosure.
Figure 12D:
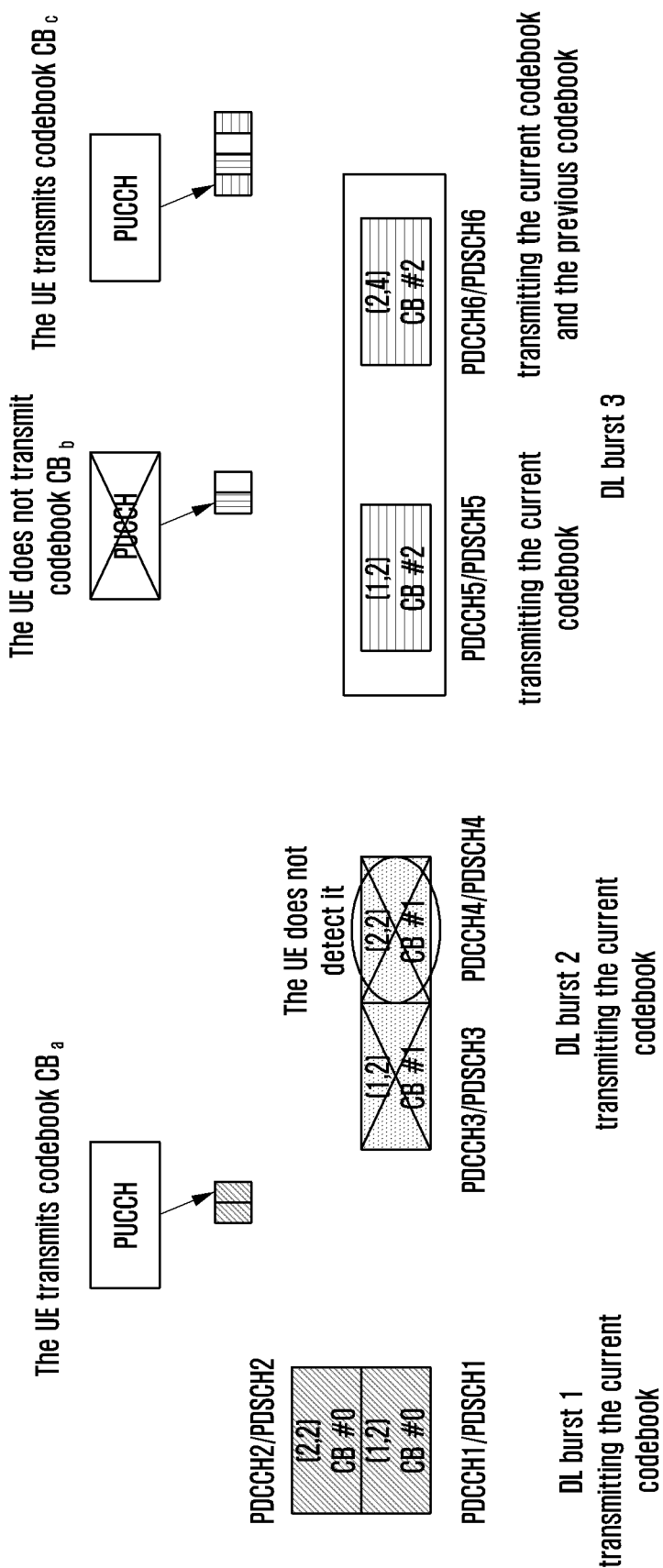
FIG. 12d is a schematic diagram of determining one or more HARQ-ACK codebooks according to various embodiment of the disclosure.

For simplification, for multiple PDCCHs with the same HARQ-ACK codebook number, the base station needs to avoid changes in the set of codebooks that need to be transmitted together in these PDCCHs. This may avoid the problem that the UE cannot distinguish the discontinuous C-DAIs and/or the T-DAIs being caused by the missed detection of the PDCCH corresponding to which codebook, due to the change of the set of codebooks that need to be transmitted together. An example of how the base station ensures that the set of the codebooks that need to be transmitted together indicated by the multiple PDCCHs with the same codebook index is unchanged is given below: the PDSCH of the downlink transmission burst 1 corresponds to the HARQ-ACK codebook #0, and indicates that the HARQ-ACK codebook #0 should be transmitted before the downlink transmission burst 2. If the base station does not detect the HARQ-ACK codebook #0, the base station may indicate the codebook index #1 when transmitting the PDCCH of the downlink transmission burst 2, and the codebook set to be transmitted is #0 and #1, wherein both the C-DAI/T-DAI take into account the size of the HARQ-ACK codebook #0. Then, when the UE generates a new codebook, the HARQ-ACK codebook #0 is arranged at the beginning, and then the HARQ-ACK codebook #1 is arranged. If the base station indicates that the transmission time of the HARQ-ACK codebook #0 is in the middle of the downlink transmission corresponding to the HARQ-ACK codebook #1, and if the base station does not detect the HARQ-ACK codebook #0, the base station may select to trigger the retransmission of the HARQ-ACK codebook #0 in the PDCCH corresponding to the HARQ-ACK codebook #2, that is, the retransmission of the HARQ-ACK codebook #0 is not trigged in the PDCCH corresponding to the HARQ-ACK codebook #1. As shown in FIG. 12b. Or, the base station indicates the HARQ-ACK codebook #0 and codebook #1 are transmitted together in all the PDCCHs corresponding to the HARQ-ACK codebook #1.

In the system design, in order to support more flexible scheduling, for multiple PDCCHs with the same HARQ-ACK codebook number, the base station may indicates the change of the set of codebooks that need to be transmitted together in these PDCCHs. In this case, in order to avoid the impact of the retransmitted codebook on the current codebook, it may be defined, the set of the codebooks need to be transmitted together indicated in multiple PDCCHs associated with the same PUCCH determined by the HARQ-ACK timing (K1) cannot be changed, and the codebook needs to be transmitted together indicated in the multiple PDCCHs associated with different PUCCHs determined by the HARQ-ACK timing may be changed. It may also at least define that the T-DAI transmitted by the base station indicates the number of all PDSCHs corresponding to the codebook (i.e., the predictable T-DAI described above), if the codebook set to be transmitted having one codebook, and the T-DAI indicates the sum of the number of the PDSCHs corresponding to the multiple codebooks, if the codebook set to be transmitted having multiple codebooks. As shown in FIG. 12b, the UE correctly receives the PDCCH 1/2 in the downlink burst 1 and successfully transmits the codebook $CB_a$. In the downlink transmission burst 2, the UE only detects PDCCH3 and does not detect PDCCH4, but the UE has already determined that the size of the codebook $CB_b$ is 2 bits of HARQ-ACK through the T-DAI in PDCCH3. Then, the UE receives the PDCCH5 of the downlink burst 3 at the time which is earlier than the time of transmitting the codebook $CB_b$ indicated by the base station, thus, the base station only indicates to transmit the current codebook in the PDCCH 5. Subsequently, the UE attempts to transmit the codebook $CB_b$ in the uplink slot of the codebook $CB_b$ indicated by the base station, but fails to transmit it because the LBT fails. The base station does not detect the codebook $CB_b$, thus the base station instructs the UE to transmit the current and previous codebooks (i.e., the codebook CB b and the codebook $CB_c$) in PDCCH6, and indicates that the T-DAI is 4, that is, the total size of the two codebooks is 4 bits, and C-DAI is 2, that is, this PDCCH is the second codebooks in the current codebooks. According to a predefined codebook arrangement order, for example, according to the chronological order in which the transmission codebook indication is received, the UE may sequentially generate 4 bits of HARQ-ACKs, which are HARQ-ACKs of the PDSCH5, PDSCH3, PDSCH4, and PDSCH6, respectively, wherein the UE does not receive the PDSCH4, thus the NACK placeholder bit is generated. Or, the UE sequentially generates HARQ-ACKs of PDSCHs 5, 6, 3, 4 according to the principle of arranging the current codebook first and then arranging the retransmitted codebook.

For a semi-static codebook, if the base station indicates the codebook index and the set of codebooks need to be transmitted together in the PDCCH, the UE generates HARQ-ACK according to the decoding result, with respect to the received HARQ-ACK of the HARQ process in the set of codebooks that need to be transmitted together, and it is set as NACK, with respect to unreceived the HARQ-ACK of HARQ process.

If a semi-static codebook is combined with a dynamic codebook, for example, a conventional dynamic codebook is used for the current HARQ-ACK codebook to be transmitted, and both the C-DAI and T-DAI count in the current codebook, and the base station may indicate the codebook index and the set of codebooks need to be transmitted together. For the retransmitted codebook, the size of the codebook is determined according to the predefined size or the size configured by the base station.

Figure 14:
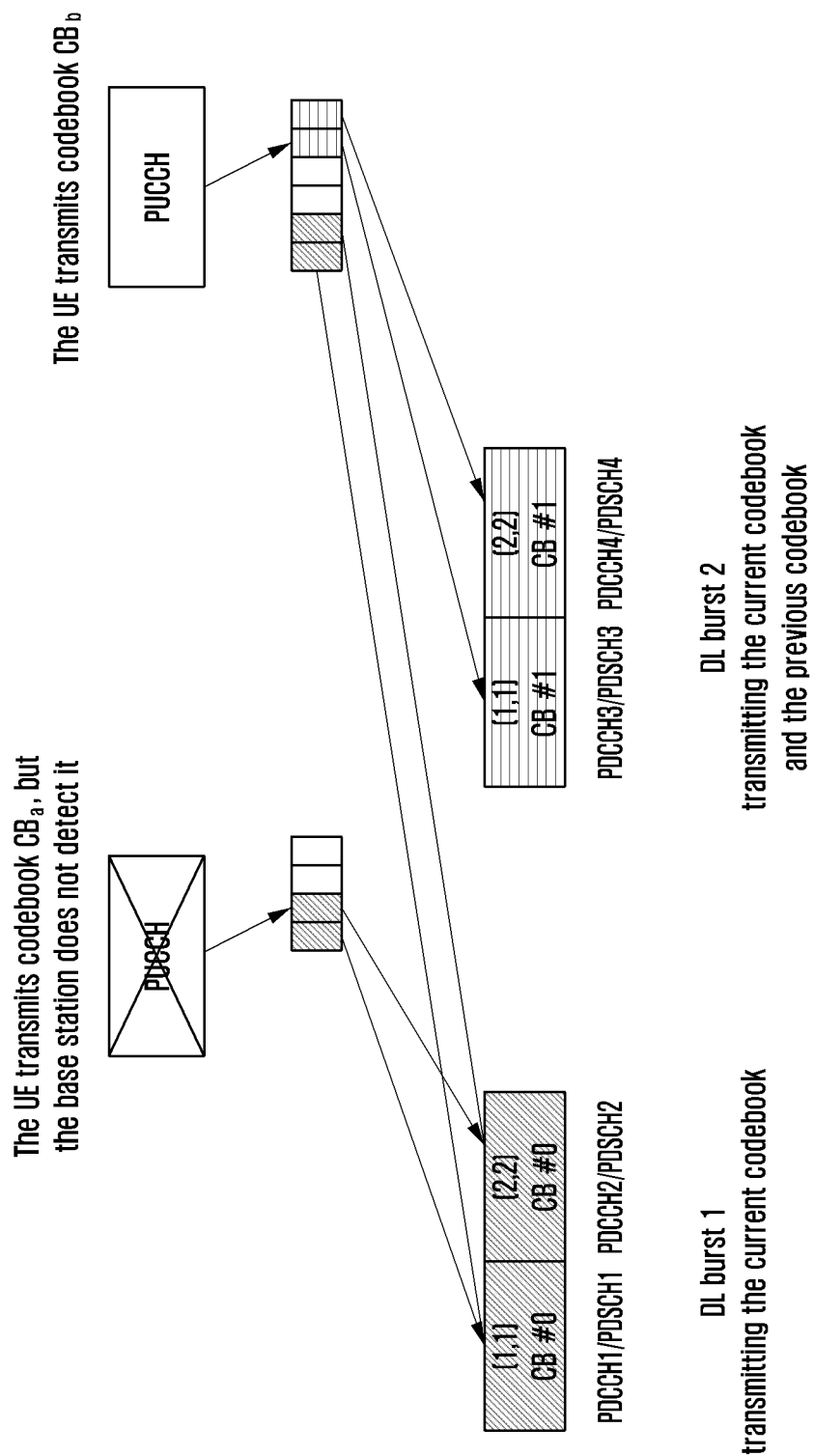
FIG. 14 is a schematic diagram of determining one or more HARQ-ACK codebooks according to various embodiment of the disclosure.

As shown in FIG. 14, the base station configures the size of the retransmitted codebook as 4 bits of HARQ-ACK. Then, when the UE receives that the base station indicates to transmit the current codebook together with the previous codebook in the PDCCH3/4, the UE generates 4 bits for the previous codebook, wherein the previous 2 bits are determined as the HARQ-ACK according to the decoded result of the received PDSCH1/2 and the last 2 bits are determined as NACK, and the UE generates 2 bits of HARQ-ACK for the current codebook, and generates HARQ-ACK according to the decoding result of PDSCH3/4.

For another example, for the retransmitted codebook, it is generated according to the semi-static codebook, that is, the codebook is determined according to the HARQ-ACK timing K1, the uplink and downlink configuration, and the PDSCH resource configuration in each slot. If the UE does not receive any of the PDCCHs of the retransmitted codebook, the codebook is generated according to a predefined size, for example, the predefined size is 0 or is configured by the base station.

For another example, for a retransmitted codebook, the size of the codebook is an integer multiple of R. If the number of PDSCHs actually received by the UE is not an integer multiple of R, the codebook size is determined by an integer multiple of R that is closest to and not less than this number.

When the UE is configured to have both HARQ-ACK feedback based on Code Block Group (CBG) and HARQ-ACK feedback based on Transport Block (TB), the DAI in the PDCCH counts respectively for CBG and TB. If multiple HARQ-ACK codebooks are contained, the HARQ-ACKs of the TBs of each codebook are first cascaded to form a sub-codebook, and then the HARQ-ACKs of the CBGs of each codebook are cascaded to combine another sub-codebook. Then the two sub-codebooks are cascaded again. In another implementation, for each codebook, the HARQ-ACKs of the TB and the CBG are cascaded, and then these codebooks are cascaded. Preferably, the HARQ-ACK of the current codebook is arranged in front of the HARQ-ACKs of all of the codebooks.

In a normal case, the indication information for determining HARQ-ACK codebook in the DCI in the fallback mode and the DCI in the normal mode are different. For example, the DCI for scheduling downlink transmission in the normal mode contains the HARQ-ACK codebook indication, the HARQ-ACK retransmission indication and T/C-DAI, and the DCI for scheduling downlink transmission in the fallback mode may only contain part of indication information. For example, the DCI in the fallback mode only contains C-DAI. Obviously, if the UE only receives the DCI in the fallback mode, the UE can only determine the codebook according to the C-DAI. When the UE not only receives the DCI in the normal mode but also receives the DCI in the fallback mode, the UE may determine which HARQ-ACK of PDSCH scheduled in the DCI is transmitted by a same PUCCH according to the HARQ-ACK timing K1 in the DCI and the PUCCH resource indication, so as to determine these HARQ-ACKs of the PDSCH belong to a same codebook. In order to the robustness of the feedback of the HARQ-ACK, it may be defined that the base station cannot schedule the UE to transmit the retransmitted HARQ-ACK codebook on the PUCCH of the HARQ-ACK of the PDSCH, if the base station schedules the PDSCH transmission for one UE by the DCI in the fallback mode. For example, the base station schedules PDSCHs 1-4 in the downlink transmission burst 1 and indicates that the HARQ-ACK codebook of the PDSCHs 1-4 is CB #0 and is transmitted in the uplink slot n1. The UE fails to transmit CB #0 in the uplink slot n1. The base station schedules PDSCH5/6 in the downlink transmission burst 2, wherein the DCI scheduling PDSCH5 is DCI 1_0 in the fallback mode, and the DCI scheduling PDSCH6 is the DCI 1_1 in the normal mode. The base station indicates that the HARQ-ACK codebook of the PDSCH5/6 is CB #1, and is transmitted in the uplink slot n2. In the DCI 1_0 scheduling PDSCH5, it is indicated that C-DAI=1, and in the DCI 1_1 scheduling PDSCH6, the base station cannot indicate that CB #1 is transmitted together with CB #0 and can only indicate to transmit CB #1, and wherein (C-DAI, T-DAI)=(2,2). Then, the UE transmits only CB #1 in the uplink slot n2, which contains 2 bits of HARQ-ACK. It is not difficult to see that when the UE receives the first DCI 1_0 corresponding to one PUCCH, the UE considers that the value of the C-DAI in the DCI satisfies $0 < x \leq N_d$, wherein $N_d = 2^n$, n is the bit number of the DAI. In this example, the value of the C-DAI of DCI 1_0 is 1.

Similarly, for the DCI scheduling the uplink transmission, the indication information for determining HARQ-ACK codebook in the DCI in the fallback mode and the DCI in the normal mode are different. For the semi-static codebook, the DCI in the normal mode for scheduling uplink transmission may contain information for indicating whether it is necessary to transmit the HARQ-ACK codebook in the PUSCH and size information of the transmitted codebook, for example, determining the size of the codebook according to the HARQ-ACK timing K1 or determining the size of the codebook according to the K1 and the extended HARQ-ACK timing K_offset. The UE may generate the codebook according to the corresponding indication information, and transmit it in the PUSCH. However, the DCI in the fallback mode may not contain any HARQ-ACK codebook information, or the DCI in the fallback mode may only contain one bit of codebook indication information, indicating whether to transmit the HARQ-ACK codebook in the PUSCH. If it is indicated that it is necessary to transmit the codebook, then the size of the codebook is determined according to the HARQ-ACK timing K1, or if it is indicated that it is necessary to transmit the codebook, the size of the codebook is determined based on all the HARQ processes.

Embodiment 5

The slot length of the UL BWP where the PUCCH is located is $\mu_{UL}$, and the slot length of the DL BWP where the PDSCH is located is $\mu_{DL}$. For example, in the NR system, the slot lengths are 1 ms, 0.5 ms, 0.25 ms, and 0.125 ms, corresponding to subcarrier spacing (SCS) of 15 kHz, 30 kHz, 60 kHz, and 120 kHz, respectively. For the HARQ-based PDSCH transmission, in the PDCCH scheduling the PDSCH, the delay (K1) from the PDCCH to the scheduled PDSCH may be set in units of the slot length $\mu_{DL}$ of the UL BWP where the PUCCH is located. The UE may allocate the HARQ-ACK positions of the PDSCH transmission on the DL BWP according to the $\mu_{DL}$ and the $\mu_{DL}$.

The HARQ-ACK codebook for which the UE feeds back HARQ-ACK information may be semi-statically determined. For one carrier, all HARQ-ACK positions for this carrier are determined according to the configured set K of K1, the semi-static slot pattern, the configured PDCCH monitoring occasions and/or the configured set T. All HARQ-ACK positions in the case of carrier aggregation (CA) can be obtained by cascading HARQ-ACK positions of multiple carriers. The set T is a set of PDSCH time resources, and each element of the set T may indicate one possible starting OFDM symbol and the number of symbols of PDSCHs. Each element of the above set T may also indicate to the scheduling delay K0. Each element of the above set T may also indicate the PDSCH type. For example, the set T may be determined according to the possible PDSCH time resources of the currently activated BWP. The above set T is a set of time resources which can be indicated by the time domain resource assignment of DCI.

Case 1: $\mu_{UL} \geq \mu_{DL}$, and it is assumed that $M=\mu_{UL}/\mu_{DL}$

Figure 15:
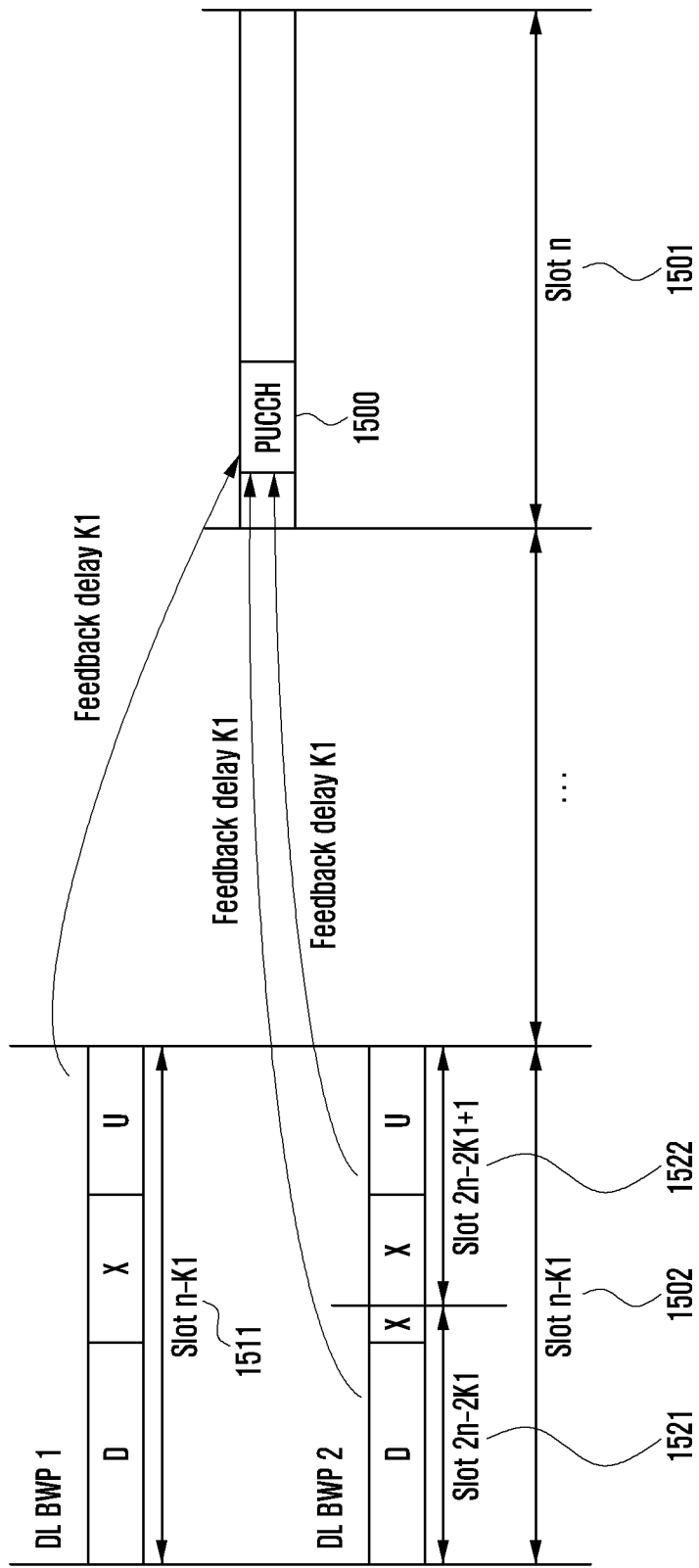
FIG. 15 is a schematic diagram of generating a semi-static HARQ-ACK codebook when a slot of a PUCCH is relative long.

Since $\mu_{UL} \geq \mu_{DL}$, the length of one slot of the UL BWP is equal to the length of M slots of the DL BWP. For one value of K1, for the PDSCH of the M slots M·(n-K1)+m, wherein m=0,1, ... M-1 of the DL BWP, the PDCCH scheduling these PDSCHs indicates the PUCCH resource of the slot n of the UL BWP by setting the value of K1. Based on the above analysis, for a semi-static HARQ-ACK codebook, for one carrier, according to one K1 of the configured set K of K1, it may be required to allocate the HARQ-ACK positions for the PDSCH transmission of up to M slots of the DL BWP. As shown in FIG. 15, 'D' represents a downlink OFDM symbol, 'X' represents an OFDM symbol with flexible directions, and 'U' represents an uplink OFDM symbol. According to a slot division of a UL BWP where the PUCCH is located, the HARQ-ACK is transmitted on PUCCH resource (1500) in the slot n (1501). Corresponding to one K1 in the set K, the PDSCH transmitted in the slot n-K1 (1502) feeds back the HARQ-ACK in the slot n. For DL BWP 1, its slot length is the same as the slot length of the UL BWP, therefore the HARQ-ACK of the PDSCH in slot n-K1 (1511) of DL BWP 1 is mapped to PUCCH resource 1500. For DL BWP 2, its slot length is half the slot length of the UL BWP, therefore the HARQ-ACK of the PDSCH in the two slots 2n-2K1 and 2n-2K1+1 (1521, 1522) of DL BWP 2 is mapped to PUCCH resource 700.

The first processing method is, for one value of K1, to determine the HARQ-ACK positions for each slot M·(n-K1)+m, wherein m=0,1, ... M-1 of the DL BWP and to cascade the determined HARQ-ACK positions, thereby obtaining all the HARQ-ACK positions corresponding to the slot n of the UL BWP and the value of K1.

The second processing method is, for one value of K1, to determine the HARQ-ACK positions for each slot M·(n-K1)+m, wherein m=0,1, ... M-1 of the DL BWP, and obtaining the HARQ-ACK positions corresponding to the slot n of the UL BWP and the value of K1 according to the maximum of the number of the HAQR-ACK positions of the M slots.

The third processing method is, for one value of K1, to determine the HARQ-ACK positions only for the slot M·(n-K1)+q, wherein q=0 of the DL BWP and as the HARQ-ACK positions corresponding to the slot n of the UL BWP and the value of K1.

The HARQ-ACK positions of this carrier are obtained by cascading the HARQ-ACK positions of each K1 of the set K. All HARQ-ACK positions in the case of CA are obtained by cascading a plurality of HARQ-ACK positions of the carrier.

In the above three processing methods, for a slot k=M·(n-K1)+m of the DL BWP, the total number MC of the HARQ-ACK positions to be mapped for various possible PDSCH time resources within this slot is determined according to the semi-static slot pattern, configured PDCCH monitoring occasions and/or the configured set T, and each PDSCH time resource of the set T is determined to be mapped to one of the above MC HARQ-ACK positions, respectively.

A method for allocating the HARQ-ACK positions of the slot k of the DL BWP is described below. For one slot k of the DL BWP, according to information such as a semi-statically configured slot pattern, it may be that only PDSCH resources of a part of the elements in the set T are schedulable. The number of required HARQ-ACK positions may be determined according to the schedulable elements of the set T, and one HARQ-ACK position occupied by one schedulable element is determined. The schedulable elements satisfy one or more of the following conditions:

First condition: any one OFDM symbol of the PDSCH resource of the schedulable element may not be indicated as an uplink OFDM symbol in a semi-static slot pattern.

Second condition: according to the parameter K0 of the schedulable element, a PDCCH can be transmitted in slot k-K0 to schedule the PDSCH resource corresponding to the schedulable element using the parameter K0. For example, there is a PDCCH candidate in the slot k-K0 which could schedule the PDSCH resource corresponding to the schedulable element using the parameter K0 according to the configured PDCCH monitoring occasions. Or the second condition: according to the parameter K0 of the schedulable element, a PDCCH can be transmitted in slot k-K0 to schedule the PDSCH resource corresponding to the schedulable element. For example, according to the configured PDCCH monitoring occasions, there is a PDCCH candidate in the slot k-K0 to schedule the PDSCH resource corresponding to the schedulable elements.

If the PDSCH resources of the two schedulable elements of the set T may be completely overlapped or partially overlapped, it is assumed that the UE does not need to feed back the HARQ-ACK information of such two PDSCHs at the same time, and this property can be utilized to reduce the number of the HARQ-ACK positions to be allocated. Here, it may be that the base station cannot schedule the PDSCH resources of the two elements at the same time, or it may be that the base station simultaneously schedules the PDSCH resources of the two elements, however, the UE only feeds back the HARQ-ACK information of one PDSCH according to a certain priority policy. The total number MC of HARQ-ACK positions to be mapped is determined for all schedulable elements in the set T, and each of the schedulable elements is determined to be mapped to one of the above-mentioned MC HARQ-ACK positions, respectively. With this method, the MC is equal to the maximum number of non-overlapping PDSCH resources in the PDSCH resources of all schedulable elements of the set T.

First, the actually unschedulable elements in the set T is removed. The condition for determining whether one element of the set T is schedulable is that: if the first condition and the second condition of the schedulable element are satisfied at the same time, then the element is considered to be schedulable. Alternatively, the condition for determining whether one element of the set T is schedulable is that: if the first condition of the schedulable element is satisfied, the one element is considered to be schedulable. Alternatively, the condition for determining whether one element of the set T is schedulable is that: if the second condition of the schedulable element is satisfied, the one element is considered to be schedulable. Alternatively, as simplification, it is also not necessary to remove any element of the set T, that is, equivalent to considering that all elements may be schedulable.

Then, all schedulable elements in set T are mapped to the HARQ-ACK positions. If the set T is an null set, then MC is equal to 0; otherwise, the total number MC of HARQ-ACK positions to be mapped is determined according to the following steps, and each element is determined to be mapped to one of the above MC HARQ-ACK positions respectively:

1) Initializing the HARQ-ACK position counter h to 0;

2) For the current set T, determining the minimum index, denoted as E, of the ending OFDM symbol of the PDSCH represented by each element;

3) For an element of the current set T, the index of the starting OFDM symbol of the PDSCH it represents is denoted as S, and S≤E, then the PDSCH represented by this element is mapped to the HARQ-ACK position h; this element of the current set T is removed; repeating 3) until all the elements satisfying S≤E are processed;

4) h=h+1. If the current set T is not null, go to 2); otherwise, MC=h, the process ends.

Case 2: $\mu_{UL}<\mu_{DL}$, and it is assumed that M=$\mu_{DL}/\mu_{UL}$

Since $\mu_{DL}<\mu_{DL}$, the length of one slot of the DL BWP is equal to the length of M slots of the UL BWP. A method for defining HARQ-ACK feedback timing, for one PDSCH of a slot p of the DL BWP, an ending OFDM symbol of the slot M·p+M-1 of the UL BWP is aligned with an ending OFDM symbol of the slot p of the DL BWP, such that the slot M·p+M-1 of the UL BWP corresponds to K1=0. According to this method for defining the feedback timing, for one slot n of the UL BWP and for one K1, only when the ending OFDM symbol of the slot n-K1 is aligned with the ending OFDM symbol of one slot of the DL BWP, i.e. when n-K1-M+1 may be divisible by M, the HARQ-ACK of the PDSCH of the one slot of the DL BWP is transmitted in the slot n of UL BWP according to K1.

Based on the above analysis, for a semi-static HARQ-ACK codebook and for one carrier, only when n-K1-M+1 may be divisible by M, the slot set $K_L$ on the DL BWP that needs to allocate the HARQ-ACK positions includes a slot (n-K1-M+1)/M, wherein K1∈K, and K is the set of K1. The HARQ-ACK positions are determined respectively for each slot of the set $K_L$ of the DL BWPs and cascaded. For one slot $k_L$ of the set $K_L$, the method for allocating the HARQ-ACK positions of the slot k of the DL BWP in the above case 1 ($\mu_{UL} \geq \mu_{DL}$) is used for allocating the HARQ-ACK positions of the slot $k_L$, i.e., assuming k=$k_L$.

Or, for $\mu_{UL}<\mu_{DL}$, in another method for defining HARQ-ACK feedback timing, which is divided according to the slot of the UL BWP, for a value of K1 and for the PUCCH resource of the slot n of the UL BWP, only when the last OFDM symbol of the PDSCH scheduled on the DL BWP is in the slot n-K1, the PDCCH scheduling the PDSCH indicates the PUCCH resource of the slot n of the UL BWP by setting K1. For one slot p of the DL BWP, it corresponds to the slot M·p+m, wherein, m=0,1, . . . M-1, correspondingly, M different values of K1 are necessary, so that the PUCCH resources of the slot n of the UL BWP is indicated in the PDCCH. Based on the above analysis, for a semi-static HARQ-ACK codebook and for one carrier, according to the set K of K1, the slot set on the DL BWP that need to allocate the HARQ-ACK positions is $K_D$={floor((n-K1)/M)}, wherein, K1∈K. Here, different values of K1s may corresponds to the same slots on the DL BWP.

Figure 16:
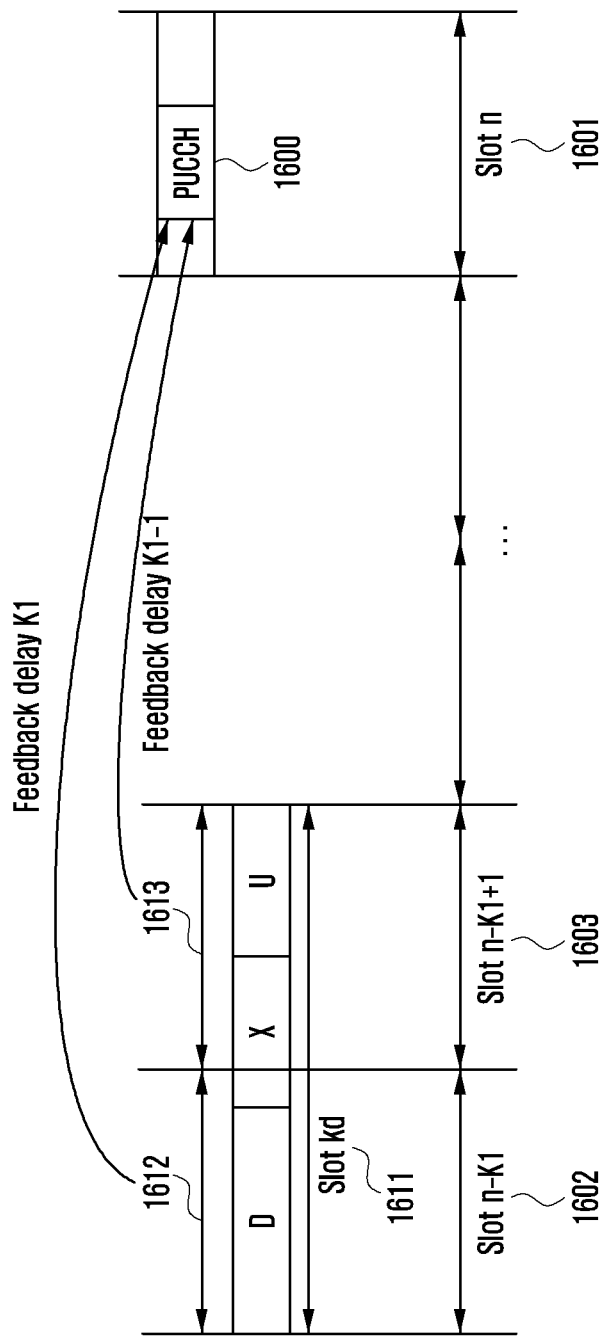
FIG. 16 is a schematic diagram of generating a semi-static HARQ-ACK codebook when a slot of a PUCCH is relative short.

The UE determines the HARQ-ACK positions for each slot $k_d$ of the set $K_D$. As shown in FIG. 16, 'D' represents a downlink OFDM symbol, 'X' represents an OFDM symbol with flexible directions, and 'U' represents an uplink OFDM symbol. According to a slot division of the UL BWP where the PUCCH is located, the HARQ-ACK is transmitted on the PUCCH resource (1600) of the slot n (1601). For the DL BWP, its slot length is twice the slot length of the UL BWP, therefore, one slot $k_d$ (1611) of the DL BWP corresponds to the two slots n-K1 and n-K1+1 (1602, 1603) which are divided according to the slot length of the UL BWP. The HARQ-ACK of the PDSCH within the time period of the previous part (1612) of the slot $k_d$ of the DL BWP, i.e. corresponding to the slot n-K1 (1602), is mapped to the PUCCH resource 1600 according to the feedback delay K1. the HARQ-ACK of the PDSCH within the time period of the latter part (1613) of the slot $k_d$ of the DL BWP, i.e. corresponding to the slot n-K1+1 (1603), is mapped to the PUCCH resource 1600 according to the feedback delay K1−1. The HARQ-ACK positions of this carrier is obtained by cascading the HARQ-ACK positions of each slot of the set $K_D$. All HARQ-ACK positions in the case of CA are obtained by cascading a plurality of HARQ-ACK positions of the carrier.

The first processing method is to determine respectively the HARQ-ACK positions for each slot of the set $K_D$ of the DL BWP and then to cascade the determined HARQ-ACK positions. For one slot $k_d$ of the set $K_D$, a method for processing the HARQ-ACK positions of the slot k of the DL BWP in the above-mentioned case 1 may be used for allocating the HARQ-ACK positions of the slot $k_d$, that is, assuming $k=k_d$. With this method and divided according to the slot of the UL BWP, for PDSCH whose last OFDM symbol is located within the slot M·kd+q, wherein 0≤q<M, even if there is no K1 in the set K, such that M·kd+q+K1=n, still allocating the HARQ-ACK positions to this PDSCH, so that resulting that more HARQ-ACK positions are allocated.

The second processing method is that: for one slot $k_d$ of the set $K_D$ of the DL BWP, which corresponds to the slot M·kd+m, wherein, m=0,1, . . . M-1 of the UL BWP, it is divided according to the slot of the UL BWP, and for the PDSCH whose last OFDM symbol is located within the slot M·kd+q, wherein 0≤q<M, only when there is K1 in the set K such that M·kd+q+K1=n, it is necessary to allocate the HARQ-ACK positions for the PDSCH. With this method, the number of the schedulable PDSCH resources may be reduced, thereby reducing the number of HARQ-ACK positions to be allocated and the feedback overhead. Further, the total number MC of HARQ-ACK positions to be mapped to various possible PDSCH time resources of the slot $k_d$ may be determined according to the semi-static slot pattern, the configured PDCCH monitoring occasions, and/or the configured set T, and each PDSCH time resource of the set T is determined to be mapped to one of the above MC HARQ-ACK positions respectively.

For one slot $k_d$ of the set $K_D$ of the DL BWP, it may be that only the PDSCH resources of a part of the elements of the set T are schedulable. The number of required HARQ-ACK positions may be determined according to the schedulable elements of the set T, and one HARQ-ACK position occupied by one schedulable element is determined. The schedulable elements may satisfy one or more of the following conditions:

First condition: any one OFDM symbol of the PDSCH resources of all the schedulable elements may not be indicated as an uplink OFDM symbol in a semi-static slot pattern.

Second condition: according to the parameter K0 of the schedulable element, a PDCCH can be transmitted in slot k-K0 to schedule the PDSCH resource corresponding to the schedulable element using the parameter K0. For example, there is a PDCCH candidate in the slot k-K0 which could schedule the PDSCH resource corresponding to the schedulable element using the parameter K0 according to the configured PDCCH monitoring occasions. Or a second condition: according to the parameter K0 of the schedulable element, a PDCCH can be transmitted in slot k-K0 to schedule the PDSCH resource corresponding to the schedulable element. For example, there is the PDCCH candidate in the slot k-K0 to schedule the PDSCH resources corresponding to the schedulable element according to the configured PDCCH monitoring occasions.

The third condition: the last OFDM symbol of the PDSCH of the schedulable element, which is divided according to the slot of the UL BWP, is located within the slot M·kd+q, wherein 0≤q<M, and according to the set K of K1, there is K1 such that M·kd+q+K1=n.

If the PDSCH resources of the two schedulable elements of the set T may be completely overlapped or partially overlapped, it is assumed that the UE does not need to feed back the HARQ-ACK information of such two PDSCHs at the same time, and this property can be utilized to reduce the number of HARQ-ACK positions to be allocated. Here, it may be that the base station may not schedule the PDSCH resources of the two elements at the same time, or it may be that the base station simultaneously schedules the PDSCH resources of the two elements. However, the UE only feeds back the HARQ-ACK information of one PDSCH according to a certain priority policy. The total number MC of HARQ-ACK positions to be mapped is determined for all schedulable elements in the set T, and each of the schedulable elements is determined to be mapped to one of the above-mentioned MC HARQ-ACK positions, respectively. With this method, MC is equal to the maximum number of non-overlapping PDSCH resources in the PDSCH resources of all schedulable elements of the set T.

First, the actually unschedulable elements in the set T are removed. The condition for determining whether one element of the set T is schedulable is that: if the first condition, the second condition and the third condition of the schedulable elements are satisfied at the same time, it is considered that the one element is schedulable. Or, the condition for determining whether one element of the set T is schedulable is that: if the first condition and the third condition of the schedulable elements are satisfied, it is considered the one element is schedulable. Or, the condition for determining whether one element of the set T is schedulable is that: if the second condition and the third condition of the schedulable elements are satisfied, it is considered the one element is schedulable. Or, the condition for determining whether one element of the set T is schedulable is that: if the third condition of the schedulable elements is satisfied, it is considered the one element is schedulable.

Then, all schedulable elements in set T are mapped to the HARQ-ACK positions. If the set T is a null set, MC is equal to 0; otherwise, the total number MC of HARQ-ACK positions to be mapped is determined according to the following steps, and each element is determined to be mapped to one of the above MC HARQ-ACK positions:

1) Initializing the HARQ-ACK position counter h to 0;
2) For the current set T, determining the minimum index, denoted as E, of the ending OFDM symbol of the PDSCH represented by each element;
3) For one element of the current set T, the index of starting OFDM symbol of the PDSCH it represents is denoted S, and then S≤E, the PDSCH represented by this element is mapped to the HARQ-ACK position h; this element of the current set T is removed; repeating 3) until all the elements satisfying S≤E are processed;
4) h=h+1. If the current set T is not null, go to 2); otherwise, MC=h, the process ends.

Figure 17:
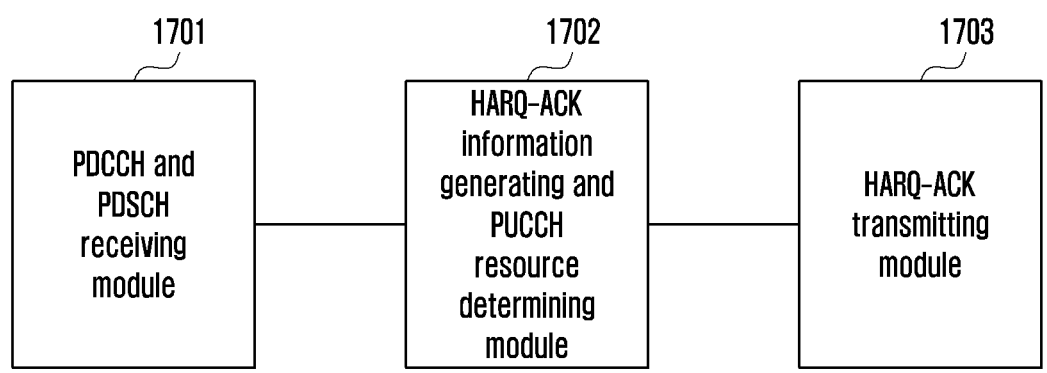
FIG. 17 is a schematic diagram of a basic structure of a user equipment according to an embodiment of the present invention.

Corresponding to the foregoing method, the present application further discloses a device, which may be used to implement the foregoing method. As shown in FIG. 17, the device comprises a PDCCH and PDSCH receiving module 1701, an HARQ-ACK information generating and PUCCH resource determining module 1702, and an HARQ-ACK transmitting module 1703, wherein:

the PDCCH and PDSCH receiving module 1701 is configured to detect a PDCCH and receive a PDSCH scheduled by the PDCCH;

the HARQ-ACK information generating and PUCCH resource determining module 1702 is configured to determine the HARQ-ACK information to be fed back and the PUCCH resources for transmitting UCI according to the slot lengths of a downlink BWP and uplink BWP, HARQ-ACK codebook information, a starting OFDM symbol of the PUCCH resource for feeding back UCI and/or the processing capability requirements of the UE;

the HARQ-ACK transmitting module 1703 is configured to transmit the HARQ-ACK on the PUCCH resources.

In addition, a user equipment, comprising a PDCCH and PDSCH receiving module 1701, an HARQ-ACK information generating and PUCCH resource determining module 1702, and an HARQ-ACK transmitting module 1703, wherein:

the PDCCH and PDSCH receiving module 1701, configured to detect a PDCCH and receive a PDSCH scheduled by the PDCCH;

the HARQ-ACK information generating and PUCCH resource determining module 1702 is configured to determine HARQ-ACK information to be fed back and a PUCCH resource for transmitting UCI according to at least one of the following: slot lengths of downlink BWP and uplink BWP, HARQ-ACK codebook information, a starting OFDM symbol of the PUCCH resource for feeding back the UCI and UE's processing capability requirements;

the HARQ-ACK transmitting module 1703 is configured to transmit a HARQ-ACK on the PUCCH resource.

One of ordinary skilled in the art can understand that all or part of the steps carried by the method of the above embodiments can be completed by a program to instruct related hardware, and the program may be stored in a computer readable storage medium, which includes one or a combination of the steps of the method embodiments when the program is executed.

In addition, each functional unit in each embodiment of the present application may be integrated into one processing module, or each unit may exist physically separately, or two or more units may be integrated into one module. The above integrated modules can be implemented in the form of hardware or in the form of software functional modules. The integrated modules, if implemented in the form of software functional modules and sold or used as separate products, may also be stored in a computer readable storage medium.

The storage medium mentioned above may be a read only memory, a magnetic disk or an optical disk or the like.

The above description is only for the preferred embodiment of the present application, and is not intended to limit the present application. Any modifications, equivalent substitutions, improvements, etc., which are made within the spirit and principles of the present application, should be included in the scope of protection of the present application.

The invention claimed is:

1. A method performed by a user equipment (UE) for transmitting uplink control information (UCI), the method comprising:

detecting a physical downlink control channel (PDCCH);

determining positions for physical downlink shared channel (PDSCH) receptions on a downlink (DL) bandwidth part (BWP), based on a first parameter for the DL BWP and a second parameter for an uplink (UL) BWP, each of the first parameter and the second parameter being associated with a subcarrier spacing (SCS), respectively;

receiving a PDSCH;

determining hybrid automatic repeat request acknowledge (HARQ-ACK) information to be fed back and a physical uplink control channel (PUCCH) resource for transmitting the UCI; and transmitting the UCI including the HARQ-ACK information on the PUCCH resource, wherein the HARQ-ACK information comprises a HARQ-ACK information bit for the PDSCH corresponding to the positions for PDSCH receptions.

2. The method of claim 1, wherein the determining of the PUCCH resource for transmitting the UCI comprises:

in case that the UE receives at least one PDCCH, an ending time of the PDCCH is not later than a time when the UE starts to prepare to feed back the HARQ-ACK information on a first PUCCH resource, and an ACK/NACK Resource Indicator (PRI) field of the PDCCH indicates a second PUCCH resource, determining that the PUCCH resource for transmitting the UCI is the second PUCCH resource; and in case that the UE does not receive the PDCCH indicating the second PUCCH resource before the UE starts to prepare to feed back the HARQ-ACK information on the first PUCCH resource, determining that the PUCCH resource for transmitting the UCI is the first PUCCH resource, wherein the first PUCCH resource and the second PUCCH resource are in a same slot, and a starting Orthogonal Frequency Division Multiplexing (OFDM) symbol of the first PUCCH resource is earlier than a starting OFDM symbol of the second PUCCH resource.

3. The method of claim 1, wherein in case that a starting Orthogonal Frequency Division Multiplexing (OFDM) symbol of a second PUCCH resource is not later than a starting OFDM symbol of a first PUCCH resource, the UE feeds back the HARQ-ACK information on the second PUCCH resource, and wherein the first PUCCH resource and the second PUCCH resource are in a same slot, and the UE first receives a PDCCH indicating the first PUCCH resource and receives a PDCCH indicating the second PUCCH resource later.

4. The method of claim 1, wherein the determining of the PUCCH resource for transmitting the UCI comprises:

for all PDSCHs whose interval between an ending Orthogonal Frequency Division Multiplexing (OFDM) symbol and a starting OFDM symbol of a earliest PUCCH resource is no less than a threshold $T$, determining that the PUCCH resource for transmitting the UCI is a first PUCCH resource; and for the PDSCHs whose interval between the ending OFDM symbol and the starting OFDM symbol of the earliest PUCCH resource is less than a threshold $T$, determining that the PUCCH resource for transmitting UCI is a second PUCCH resource, and wherein the first PUCCH resource and the second PUCCH resource are in a same slot.

5. The method of claim 1, wherein the first parameter is associated with a slot length of the DL BWP where the PDSCH is located and the second parameter is associated with a slot length of the UL BWP where the PUCCH resource is located, and wherein the HARQ-ACK information is transmitted in a slot where the PUCCH resource is located.

6. The method of claim 5, wherein in case that the second parameter is greater than or equal to the first parameter, for a slot n where the PUCCH resource is located and for a timing value K1 from the PDSCH to a corresponding HARQ-ACK in time domain, the positions for PDSCH receptions are determined as slots given by M·(n-K1)+m, wherein m=0,1, . . . M-1 of the DL BWP, and wherein, M is equal to the second parameter divided by the first parameter and n is a number greater than or equal to 0.

7. The method of claim 6, wherein:

for each of slots given by M·(n-K1)+m, of the DL BWP, the positions for PDSCH receptions are determined respectively and cascaded as the positions for PDSCH receptions corresponding to the slot n of the UL BWP and the timing value K1; or for each of slots given by M·(n−K1)+m of the DL BWP, the positions for PDSCH receptions are determined, and the positions for PDSCH receptions corresponding to the slot n of the UL BWP and the timing value K1 are obtained according to a maximum number of slots of the positions for PDSCH receptions; or only for a slot M·(n−K1)+q, wherein q=0 of the DL BWP, the positions for PDSCH receptions are determined as the positions for PDSCH receptions corresponding to the slot n of the UL BWP and the timing value K1.

8. The method of claim 5,
wherein in case that the second parameter is less than the first parameter, only when n−K1−M+1 is divisible by M, the positions for PDSCH receptions are determined for each slot of a slot set KL on the DL BWP, the slot set KL comprising slots (n−K1−M+1)/M, K1∈K, K is a set of K1,
wherein n is an index of the slot where the PUCCH resource is located,
wherein M is equal to the first parameter divided by the second parameter, and
wherein K1 is a delay between a PDSCH reception and a corresponding HARQ-ACK transmission.

9. The method of claim 5, wherein the determining of the positions for PDSCH receptions comprises:
in case that the second parameter is less than the first parameter according to a set K of K1, determining that a slot set $k_D$ on the DL BWP to be allocated the positions for PDSCH receptions is $K_d$=floor((n−K1)/M), wherein, K1∈K; and
determining the positions for PDSCH receptions for each slot kd of the slot set $K_D$,
wherein n is an index of the slot where the PUCCH resource is located,
wherein M
is equal to the first parameter divided by the second parameter, and
wherein K1 is a delay between a PDSCH reception and a corresponding HARQ-ACK transmission.

10. The method of claim 9, wherein:
the positions for PDSCH receptions are allocated to each slot kd of the slot set $K_D$, according to a slot division of the UL BWP, for the PDSCH whose last OFDM symbol is within the slot M·kd+q, wherein 0≤q<M, even if there is no K1 in the set K such that M·kd+q+K1=n, the positions for PDSCH receptions are still allocated to this PDSCH; or
the positions for PDSCH receptions are allocated to each slot kd of the slot set $K_D$, according to the slot division of the UL BWP, for the PDSCH whose last OFDM symbol is within the slot M·kd+q+, wherein 0≤q<M only when there is K1 in the set K such that M·kd+q+K1=n, the positions for PDSCH receptions are allocated to this PDSCH.

11. The method of claim 5,
wherein in case that the first parameter is less than the second parameter, for one timing value, the HARQ-ACK positions for the PDSCH receptions are allocated to a plurality of slots of the DL BWP, and
wherein the one timing value is a delay between a PDSCH reception and a corresponding HARQ-ACK transmission.

12. The method of claim 5, further comprising:
in case that the first parameter is greater than the second parameter, identifying whether a first value determined based on n−K1+1 is divisible by a second value,
wherein n is an index of the slot where the PUCCH resource is located,
wherein K1 is a delay between a PDSCH reception and a corresponding HARQ-ACK transmission, and
wherein the second value is equal to the first parameter divided by the second parameter.

13. The method of claim 1, wherein the determining the HARQ-ACK information to be fed back comprises determining a HARQ-ACK codebook according to the least one type of information:
HARQ-ACK codebook number,
HARQ-ACK codebook set to be fed back,
a total number of DL assignment indicators (T-DAI) and/or counter of DAI (C-DAI) determined according to the HARQ-ACK codebook set to be fed back, and
T-DAI and/or C-DAI determined according to latest HARQ-ACK codebook to be fed back, and a size of another codebook in the HARQ-ACK codebook set to be fed back determined according to a value which is predefined or configured by a higher layer signaling.

14. The method of claim 13, wherein the determining of the HARQ-ACK codebook comprises:
for one PDSCH of a same HARQ process, in case that the HARQ-ACK information of the PDSCH has not been transmitted, determining a value of the HARQ-ACK information according to a decoding result of the PDSCH in the latest HARQ-ACK feedback; and in case that the HARQ-ACK has been transmitted and a timer timed out, determining the value of the HARQ-ACK information of the PDSCH as a predefined value, or, determining the value of the HARQ-ACK information according to the decoding result of the PDSCH.

15. The method of claim 13, wherein the determining of the HARQ-ACK codebook comprises:
for multiple PDCCHs whose HARQ-ACK codebook index are the same, the HARQ-ACK codebook sets to be transmitted together indicated in PDCCHs being the same.

16. The method of claim 13,
wherein for multiple PDCCHs whose HARQ-ACK codebook index are the same, HARQ-ACK timing information of PDSCH scheduled by any one PDCCH is determined by HARQ-ACK timing information indicated by another PDCCH.

17. The method of claim 1, wherein the positions for PDSCH receptions are determined based on a ratio of the first parameter and the second parameter.

18. The method of claim 1, wherein the positions for PDSCH receptions are determined further based on a set of slot timing values K1 and a set of PDSCH time resources.

19. A user equipment (UE), comprising:
a physical downlink control channel (PDCCH) and a physical downlink shared channel (PDSCH) receiving module;
a hybrid automatic repeat request acknowledge (HARQ-ACK) information generating and physical uplink control channel (PUCCH) resource determining module; and
an HARQ-ACK transmitting module,
wherein the PDCCH and PDSCH receiving module is configured to detect a PDCCH and receive a PDSCH,
wherein the HARQ-ACK information generating and PUCCH resource determining module is configured to:

determine positions for PDSCH receptions on a downlink (DL) bandwidth part (BWP), based on a first parameter for the DL BWP and a second parameter for an uplink (UL) BWP, each of the first parameter and the second parameter being associated with a subcarrier spacing (SCS), respectively, and determine HARQ-ACK information to be fed back and a PUCCH resource for transmitting uplink control information (UCI), wherein the HARQ-ACK transmitting module is configured to transmit the UCI including the HARQ-ACK information on the PUCCH resource, and wherein the HARQ-ACK information comprises a HARQ-ACK information bit for the PDSCH corresponding to the positions for PDSCH receptions.

* * * * *